United States Patent
Burch, V et al.

(10) Patent No.: US 11,747,820 B2
(45) Date of Patent: Sep. 5, 2023

(54) ENHANCED SYSTEMS, APPARATUS, AND METHOD FOR IMPROVED AUTOMATED AND AUTONOMOUS OPERATION OF LOGISTICS GROUND SUPPORT EQUIPMENT

(71) Applicant: FEDEX CORPORATE SERVICES, INC., Collierville, TN (US)

(72) Inventors: Reuben F. Burch, V, Columbus, MS (US); Sherif Abelwahed, Starkville, MS (US); John E. Ball, Starkville, MS (US); Matt Doude, Starkville, MS (US); James R. Gafford, Charlotte, NC (US); Tyler J. Hannis, Starkville, MS (US); Yucheng Liu, Starkville, MS (US); Michael S. Mazzola, Mint Hill, NC (US); Howard McKinney, Bartlett, TN (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 97 days.

(21) Appl. No.: 17/466,033

(22) Filed: Sep. 3, 2021

(65) Prior Publication Data

US 2021/0397196 A1 Dec. 23, 2021

Related U.S. Application Data

(63) Continuation of application No. 16/524,723, filed on Jul. 29, 2019, now Pat. No. 11,157,011.
(Continued)

(51) Int. Cl.
*G05D 1/02* (2020.01)
*G05D 1/00* (2006.01)
*G06V 20/58* (2022.01)

(52) U.S. Cl.
CPC ......... *G05D 1/0223* (2013.01); *G05D 1/0027* (2013.01); *G05D 1/0088* (2013.01); *G05D 1/0289* (2013.01); *G06V 20/58* (2022.01)

(58) Field of Classification Search
CPC .. G05D 1/0223; G05D 1/0027; G05D 1/0088; G05D 1/0289; G06V 20/58
See application file for complete search history.

(56) References Cited

U.S. PATENT DOCUMENTS 10,048,697 B1 8/2018 Theobald
11,157,011 B2 10/2021 Burch, V et al.
(Continued)

FOREIGN PATENT DOCUMENTS

FR 2919543 A1 * 2/2009 ................ B60P 1/00

*Primary Examiner* — Calvin Cheung
(74) *Attorney, Agent, or Firm* — WITHERS & KEYS, LLC

(57) ABSTRACT

An improved retrofit assembly for ground support equipment providing autonomous operation of the logistics ground support equipment (GSE). The assembly has a refit control system attached to the GSE (with a vehicle dynamics control processor and a data preprocessing control processor), retrofitted proprioceptive sensors coupled to the vehicle dynamics control processor monitoring operating parameters and characteristics of the GSE, retrofitted exteroceptive sensors coupled to the data preprocessing control processor that monitor an exterior environment of the GSE, and refit actuators for different control elements on the GSE and to autonomously alter motion of the GSE. The refit control system programmatically receives sensor data from the proprioceptive sensors and exteroceptive sensors; optimizes a path for the GSE based upon the different sensor data; and activates at least one of the actuators according to the optimized path for the GSE.

28 Claims, 16 Drawing Sheets

Related U.S. Application Data

(60) Provisional application No. 62/711,691, filed on Jul. 30, 2018.

(56) References Cited

U.S. PATENT DOCUMENTS

| | | |
|---|---|---|
| 2013/0103552 A1 | 4/2013 | Hoffman et al. |
| 2013/0236279 A1 | 5/2013 | Franzen et al. |
| 2013/0184977 A1 | 7/2013 | Venkatasubramanian |
| 2014/0214259 A1 | 7/2014 | Trepagnier et al. |
| 2016/0063330 A1 | 3/2016 | Xu et al. |
| 2016/0239802 A1 | 8/2016 | Burch, V et al. |
| 2017/0003682 A1 | 1/2017 | Segman et al. |
| 2017/0124781 A1 | 5/2017 | Douillard et al. |
| 2017/0357270 A1 | 12/2017 | Russell |
| 2018/0079601 A1 | 3/2018 | Khong et al. |
| 2018/0113475 A1 | 4/2018 | Brazeau |
| 2018/0147900 A1 | 5/2018 | Shank et al. |
| 2018/0297615 A1 | 10/2018 | Banwart |
| 2018/0350024 A1 | 12/2018 | Kaufman |
| 2018/0373246 A1 | 12/2018 | Laughlin et al. |
| 2019/0164114 A1 | 5/2019 | Kadotani et al. |
| 2019/0265714 A1 | 8/2019 | Ball et al. |
| 2019/0318306 A1 | 10/2019 | Mere |

\* cited by examiner

|  |  | Passive | | Active | | | |
|---|---|---|---|---|---|---|---|
|  |  | Camera | Stereo Camera | LiDAR | RADAR | Ultra-sound | Laser Range Finder |
| Sensor Tasks | Object Detection | △ | ↑ | ↑ | △ | △ | ✗ |
|  | Object Classification | △ | △ | △ | ✗ | ✗ | ✗ |
|  | Beacon Ranging | ✗ | △ | ↑ | ↑ | ✗ | ✗ |
|  | Ranging | ✗ | △ | ↑ | ↑ | △ | △ |
|  | Color Recognition | △ | △ | ✗ | ✗ | ✗ | ✗ |
|  | 3-D Environment Mapping | ✗ | ✗ | ↑ | ✗ | ✗ | ✗ |
| Capability | Range | ↑ | ↑ | ↑ | ↑ | △ | ↑ |
|  | field of vision | ↑ | △ | ↑ | △ | △ | ✗ |
|  | Sensitivity | △ | △ | △ | △ | △ | ✗ |
|  | Durability | ↑ | △ | △ | ↑ | ↑ | ↑ |
|  | Daylight capability | ↑ | ↑ | ↑ | ↑ | ↑ | ↑ |
|  | All Weather capability | ✗ | ✗ | △ | ↑ | △ | △ |
|  | Depth Perception | ✗ | △ | ↑ | ↑ | △ | ↑ |
| Integration | Integration Complexity | △ | △ | △ | ✗ | ✗ | △ |
|  | Connectivity | △ | △ | △ | △ | △ | △ |
|  | Software Complexity | △ | △ | △ | △ | ↑ | △ |
|  | Processing Power | △ | △ | △ | △ | ↑ | △ |
|  | Latency | ↑ | ↑ | △ | ↑ | △ | ↑ |
| Cost | Cost | △ | △ | △ | ✗ | ↑ | ↑ |

FIG. 5

|  |  | LiDAR | LiDAR + Stereo Camera | LiDAR + Camera | RADAR + Stereo Camera |
|---|---|---|---|---|---|
| Sensor Tasks | Object Detection | ↑ | ↑ | ↑ | ↑ |
|  | Object Classification | Δ | ↑ | ↑ | Δ |
|  | Beacon Ranging | ↑ | ↑ | ↑ | ↑ |
|  | Ranging | ↑ | ↑ | ↑ | ↑ |
|  | Color Recognition | × | Δ | Δ | Δ |
|  | 3-D Environment Mapping | ↑ | ↑ | ↑ | × |

FIG. 6

| | RP2B+ | BBB | RB | MYD | UNB |
|---|---|---|---|---|---|
| Cost | $35 | $48 | $99 | $169 | $50 |
| CPU Type | ARM Cortex-A7 | ARM Cortex-A8 | ARM Cortex-A9 | ARM Cortex-A9 | ARM Cortex-A9 & M4 |
| CPU Frequency | 900MHz | 1GHz | 1GHz | 1GHz | 1GHz & 200 MHz |
| RAM | 1GB | 512MB | 512MB | 512MB | 512MB |
| USB Port | 1*USB 2.0 | 1*USB 2.0 | 1*USB 2.0 | 4*USB 2.0 | 1*USB 2.0 |
| Power Supplu | 5VDC, 2A | 5V, 500mA via microUSB or 5VDC, 2A | 5VDC, 2A | 5VDC, 2A | 5V, 500mA via microUSB or 12VDC, 2A |
| PRU | No | Yes | Yes | Yes | No |
| RTOS Support | Ported Solutions, no native support | Native Support by wide variety of RTOS, including QNX, RTLinux, and Xenomai | Supported by kernel modification | Supported by kernel modification | Supported by freeRTOS and Xenomai |
| Community Support | Strong | Strong | Ordinary | Ordinary | Strong |

FIG. 7

ENHANCED SYSTEMS, APPARATUS, AND METHOD FOR IMPROVED AUTOMATED AND AUTONOMOUS OPERATION OF LOGISTICS GROUND SUPPORT EQUIPMENT

PRIORITY APPLICATION

The present application hereby claims the benefit of priority to related U.S. Provisional Patent Application No. 62/711,691 and related parent U.S. Non-Provisional patent application Ser. No. 16/524,723, now U.S. Pat. No. 11,157,011, and entitled "Enhanced Systems, Apparatus, and Methods for Improved Automated and Autonomous Operation of Logistics Ground Support Equipment."

FIELD OF THE DISCLOSURE

The present disclosure generally relates to systems, apparatus, and methods in the field of logistics ground support equipment and, more particularly, to various aspects of systems, apparatus, and methods related to improved automated and/or autonomous aspects of operations for logistics ground support equipment, such as a cargo tractor and associated dollies towed by the cargo tractor (or tug).

BACKGROUND

There is a need for a technical solution that may be deployed to enhance ways to retrofit or refit existing logistics ground support equipment (referred to herein as GSE) for enhanced autonomous operation in ways that help to avoid collisions causing damage to logistics vehicles (such as cargo tractors and associated dollies) and doing so in an enhanced manner that improves system performance and helps reduce false positives.

In particular, what is described are various exemplary types of delineation methods and systems where an industrial vehicle may be retrofit or refit with an assembly to provide a level of autonomous operation for the vehicle in a logistics environment where cargo may be transported using GSE (e.g., cargo tractor or tug, one or dollies, and the like) in an air operations environment that is busy and crowded with objects located through the operations environment that should be avoided and under conditions where operation of the GSE can lead to collisions and accidents.

What is needed are systems and assemblies of components that may be retrofit or refit onto existing GSE so as to provide advantageous fully or semi-autonomous operation of the GSE that helps avoid collisions and helps to efficiently operate the GSE within such an air operations environment filled with hazardous conditions, obstacles, and restricted space.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, an aspect of the disclosure relates retrofitting a cargo tug control system with control actuators, sensors and usage data acquisition. This may enable semi-autonomous movement of the tug (a type of logistics ground support equipment) in airport logistics environment, captures usage data, and allows for enhanced maintenance monitoring for such tugs. In more detail in this aspect, an exemplary retrofit assembly apparatus is described for use on a logistics ground support equipment to enhance a level of autonomous operation of the logistics ground support equipment. Such an assembly generally includes a refit control system, retrofitted sensors, and actuators. The refit control system is attached to the logistics ground support equipment, and has a vehicle dynamics control processor and a data preprocessing control processor. The retrofitted sensors are coupled to the refit control system and disposed on the logistics ground support equipment as retrofitted equipment to the logistics ground support equipment. Such retrofitted sensors include a first group of proprioceptive sensors coupled to the vehicle dynamics control processor that monitor operating parameters and characteristics of the logistics ground support equipment, and a second group of exteroceptive sensors coupled to the data preprocessing control processor that monitor an exterior environment of the logistics ground support equipment. The actuators are coupled to the refit control system, where each of the actuators is disposed on the logistics ground support equipment as a retrofit actuator to add control of respective control elements on the logistics ground support equipment (e.g., steering, throttle, transmission, braking, and the like) so as to autonomously alter motion of the logistics ground support equipment during operation of the assembly. The refit control system is programmatically configured to be operative to receive first sensor data generated by the first group of proprioceptive sensors using the vehicle dynamics control processor of the refit control system; receive second sensor data generated by the second group of exteroceptive sensors using the data preprocessing control processor; optimize a path (e.g., via a determined heading and/or speed) for the logistics ground support equipment based upon the second sensor data from the data preprocessing control processor and the first sensor data from the vehicle dynamics control processor; and activate, by the vehicle dynamics control processor, at least one of the actuators according to the optimized path for the logistics ground support equipment.

Another aspect of the disclosure focuses on an adaptive control system feedback loop monitoring system for improved engine performance. This may help by proactively addressing latency and response time for logistics ground support equipment, such as a cargo tug, with considerations of sensitivity to load and/or sensitivity to position (e.g., on ramp, detected obstacles, location & orientation (near plane lower speed), building transitions, weight/grade) to improve operations of the equipment.

In still another aspect of the disclosure, methods and systems may deploy enhanced data preprocessing and spatial awareness techniques via the use of the known contextual environment for particular logistics ground support equipment (such as a cargo tug). Such a contextual environment may, for example, include information on known environments (e.g., buildings, airport layout, plane footprint, and the like) as well as a temporally detected environment of an airport and loading areas (e.g., temporary barriers/temporary objects vs base layout). Further aspects of the contextual environment may include a time component added to static/known layout issue (e.g., day v. night; seasonal issues; personnel detected) when navigating the logistics areas, such as an airport and/or particular loading and unloading areas.

Another aspect of the disclosure includes a hive type of management for a fleet of logistics ground support equipment (such as a fleet of cargo tugs). This may involve the creation of temporal spatial awareness data that is proactively distributed to other autonomous vehicles in an airport fleet so that different ones of the autonomous vehicles in the fleet may be aware of operations of other members of the fleet as a way of avoiding fleet member collisions.

In yet another aspect of the disclosure, further methods and systems involve automatic deactivation of autonomous control of logistics ground support equipment. This may involve the detection of the presence of a human operator and identifying purposeful contact in contrast to accidental contact with other objects (e.g., hooking up to a dolly as a type of anticipated object vs. an unintended collision with an unanticipated object), and human feedback upon deactivation.

Additional advantages of these and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention as recited in the claims.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIG. 5 is an exemplary table with information on different exemplary sensors in accordance with an embodiment of the invention;

FIG. 6 is an exemplary table with information on exemplary sensor tasks for a combination of exemplary sensors in accordance with an embodiment of the invention;

FIG. 7 is an exemplary table with information on implementation examples for components of an exemplary refit control system in accordance with an embodiment of the invention;

DESCRIPTION OF THE EMBODIMENTS

Figure 1A:
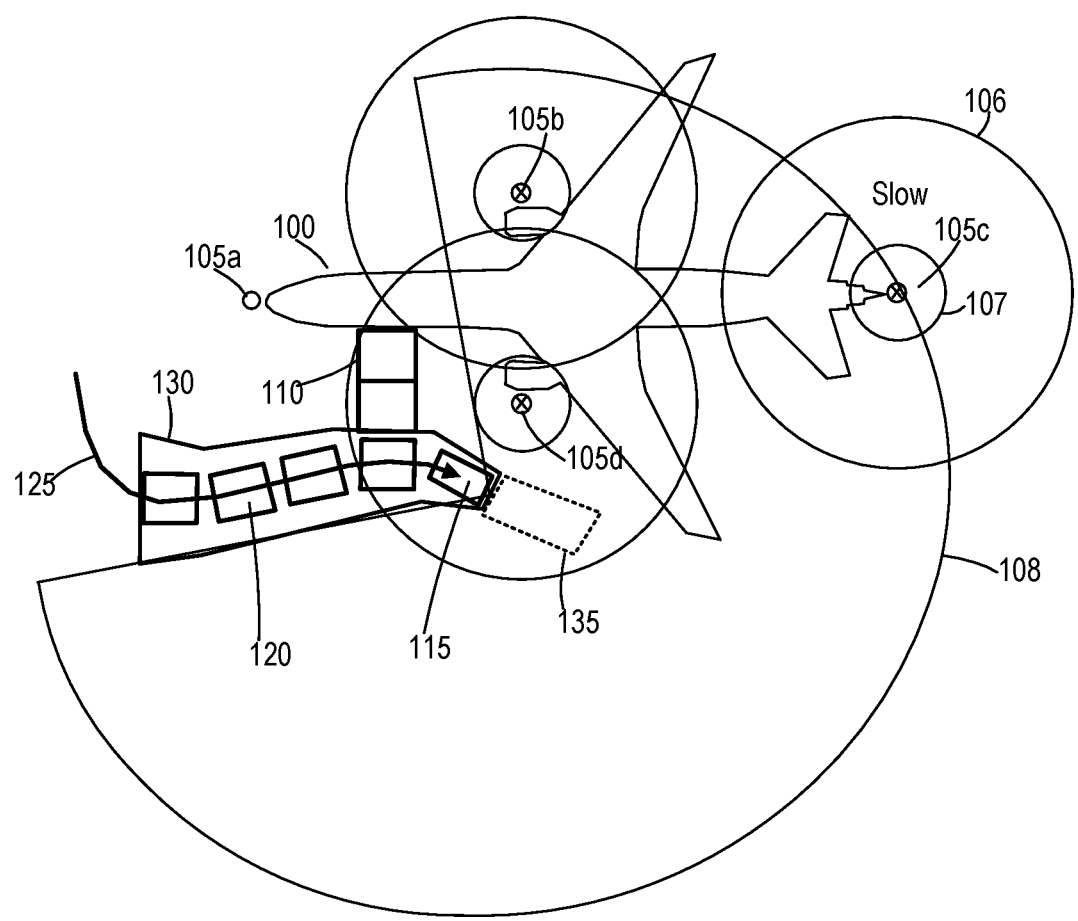
FIG. 1A is a diagram of an exemplary operating environment for exemplary logistics ground support equipment that uses a retrofit assembly apparatus for enhanced autonomous operation in accordance with an embodiment of the invention.

Reference will now be made in detail to various exemplary embodiments as described below in conjunction with the embedded drawings and tabular information. Those skilled in the art will appreciate that different embodiments may implement a particular part in different ways according to the needs of the intended deployment and operating environment for the respective embodiments.

The following describes various embodiments of different systems, apparatus, and applied methods that are deployed and used with improved and enhanced operations of logistics ground support equipment, such as a cargo tractor and associated dollies. Various aspects of different embodiments may include, for example, retrofitting or refitting a cargo tug control system with control actuators, sensors and usage data acquisition. This may enable semi-autonomous movement of the cargo tractor or tug (a type of logistics ground support equipment) in airport logistics environment, captures usage data, and allows for enhanced maintenance monitoring for such tugs. Another embodiment may focus on an exemplary adaptive control system feedback loop monitoring system for improved engine performance. This may help by proactively addressing latency and response time for logistics ground support equipment, such as a cargo tug, with considerations of sensitivity to load and/or sensitivity to position (e.g., on ramp, detected obstacles, location & orientation (near plane lower speed), building transitions, weight/grade) to improve operations of the equipment. Still further embodiments may have methods and systems deploying enhanced data preprocessing and spatial awareness techniques via the use of the known contextual environment for particular logistics ground support equipment (such as a cargo tug). Such a contextual environment may, for example, include information on known environments (e.g., buildings, airport layout, plane footprint, and the like) as well as a temporally detected environment of an airport and loading areas (e.g., temporary barriers/temporary objects vs base layout). Further aspects of the contextual environment may include a time component added to static/known layout issue (e.g., day v. night; seasonal issues; personnel detected) when navigating the logistics areas, such as an airport and/or particular loading and unloading areas.

Additional embodiments may deploy a hive type of management for a fleet of logistics ground support equipment (such as a fleet of cargo tugs). This may involve the creation of temporal spatial awareness data that is proactively distributed to other autonomous vehicles in an airport fleet so that different ones of the autonomous vehicles in the fleet may be aware of operations of other members of the fleet as a way of avoiding fleet member collisions.

Further method and system embodiments may involve automatic deactivation of autonomous control of logistics ground support equipment. This may involve the detection of the presence of a human operator and identifying purposeful contact in contrast to accidental contact with other objects (e.g., hooking up to a dolly as a type of anticipated object vs. an unintended collision with an unanticipated object), and human feedback upon deactivation.

And still additional method and system embodiments provide path optimization solutions that may leverage retrofitted hardware and sensors as a package deployed on existing fleet machines and ground support equipment. Such a solution may further leverage environmental awareness through data provided to the enhanced ground support equipment, where the environmental awareness takes the form of contextual data on temporary objects/landmarks, permanent or fixed objects/landmarks, and geofencing type of boundary information as well as information on aircraft being loaded or unloaded (e.g., type of aircraft, changes to the aircraft, the current loaded layout or status for the aircraft, what may be desired to be loaded onto the aircraft).

GSE Autonomy Refit (Cargo Tractor Autonomony Refit or C-TAR)

Retrofitting logistics ground support equipment (GSE) so that it may provide semi- or fully-autonomous operations is explained with a variety of the embodiments described herein. Embodiments involving refit GSE may also be referenced throughout this description using the term "C-TAR" (Cargo Tractor Autonomy Refit) as an electrical, mechanical, and software design package that may convert a standard, human driven cargo tractor (e.g., an exemplary logistics ground support equipment or GSE), into a semi- or fully-autonomous airport vehicle capable of altering movement of the tractor so as to, for example, avoid contact with objects including fixed (such as facilities and components), static (such as parked vehicles or aircraft), and dynamic (such as moving vehicles or humans). Embodiments of C-TAR may also allow cargo tractors (as types of enhanced GSE) to be capable of being driven either by remote or autonomously based on AI (artificial intelligence) logic that interprets the local environment and surroundings based on predetermined safety and process driven requirements specific to the logistics industry and airport environment.

Different embodiments may include, for example, retrofitting or refitting a cargo tug control system with control actuators, sensors and usage data acquisition. This may enable semi-autonomous movement of the cargo tractor or tug (a type of logistics ground support equipment) according to an optimized path in airport logistics environment, captures usage data, and allows for enhanced maintenance monitoring for such tugs.

FIG. 1A is a diagram of an exemplary operating environment for exemplary logistics ground support equipment that may use an exemplary retrofit assembly apparatus for enhanced autonomous operation in accordance with an embodiment of the invention. As shown in FIG. 1A, the operating environment includes an exemplary aircraft 100 as a type of high value asset. In general, a high value asset may be considered to be certain equipment, structure, and/or people where mobile industrial vehicles (such as cargo tractor 115 and its linked dollies 120) are desired to have limitations when approaching or moving around or near such assets. Indeed, certain areas may be considered a high value asset for the potential of having such equipment, structure, and/or people but do not necessarily have to be currently occupied. In various embodiments described herein, an off limit (or restricted movement) area associated with such a high value asset may be established or determined as a boundary for the protection of that high value asset.

The exemplary aircraft 100, shown from above in FIG. 1A, may be a type of high value asset used to transport items as part of a logistics pickup and/or delivery operation. As shown in FIG. 1A, the exemplary aircraft 100 has a nose cone structure protruding from the front end of the aircraft 100, protruding engines on each wing, and tail structure that protrudes from the back end of the aircraft 100. Those skilled in the art will appreciate that such protrusions are examples of points on the aircraft that are of more risk for collisions with mobile logistics ground support equipment operating in the vicinity of the aircraft 100. In the example shown in FIG. 1A, an exemplary reflective beacon (e.g., 105a-105d) may be placed adjacent to each of such protrusions and used during operation of the exemplary refit logistics ground support equipment described herein. Such an exemplary reflective beacon 105a-105d may be implemented with passive reflectors for LiDAR or radar to enhance the ability to locate and detect such beacons as locators of key locations around aircraft 100, even in poor visibility. As discussed in more detail below, a model predictive control module operating on a vehicle dynamics processor (as part of the retrofit control system of an embodiment) may use range and bearing to such beacons 105a-105d as part of governing speed and cargo tractor 115 motion.

In still another example, an embodiment may use a vehicle dynamics model and predictive calculations relative to a cargo tractor 115 and its towed vehicles 120 (e.g., dollies/trailers) to help prevent collisions by the cargo tractor 115 as well as the associated towed dollies 120 even though there is no active detection mechanism deployed on the dollies. The vehicle dynamics model (shown in FIG. 3), in general, is used to inform calculations performed on processing systems deployed on the cargo tractor 115 of possible future states of the cargo tractor 115 and dollies 120 (i.e., the powered logistics ground support equipment as well as the linked towed vehicles that follow). Thus, when using such a model and calculations as part of an exemplary system, a virtual perimeter 130 along the sides of the dolly train may effectively bound the system to prevent collisions from off-tracking the associated towed dollies 120. As shown in FIG. 1A, the widening track outline of perimeter 130 indicates a probabilistically determined dolly location that can be used by an exemplary collision avoidance system without the need for actual location sensors to be deployed on the dollies 120.

FIG. 1A also illustrates a cargo loading structure 110 shown alongside the fuselage of the exemplary aircraft 100 where items (e.g., unpackaged goods, packaged goods, and containers that may be used for transporting goods) may be loaded into the aircraft 100 from a cargo tractor 115 and its associated dollies 120 or where such items may be off loaded from the aircraft 100 to the cargo tractor 115 and its associated dollies 120 as part of different logistics operations. In general, the cargo tractor 115 may move along a path 125 near the aircraft 100 and its cargo loading structure 115 so as to facilitate pickup and/or delivery of items from its associated dollies 120 to and from the aircraft 100. The concentric rings around beacons 105a-105d in FIG. 1A indicate sensed reflective beacons 105a-105d near the high value asset (e.g., the noted protrusions on the aircraft) and protected or restricted areas surrounding each beach (e.g., area 106 restricted for no entry, area 107 restricted for slow speed upon entering such an area). Using range and bearing to beacons 105a-105d, an onboard control system may issue signals to control motion and speed when the virtual perimeter 130 is inside such control zones (e.g., area 106, area 107). Missing beacons outside of the sensor scanning range 108 of the sensor suite on board the cargo tractor 108 are not tracked by the sensor suite. As discussed in more detail below, cargo tractor 115 may deploy sensors (e.g., exteroceptive sensors) to sense environmental objects external to the cargo tractor, such as along the path of travel 135 for cargo tractor 115 and including beacons 105a-105d.

Those skilled in the art will appreciate that areas of technology variance in an exemplary cargo tractor fleet include (but are not limited to) electronic control and drive-by-wire systems, and powertrain technology (ranging from carbureted engines to modern fuel-injecting engines). Some exemplary cargo tractors (as exemplary types of logistics ground support equipment) may include hydraulic versus mechanical steering, throttle by wire versus throttle by cable, and vacuum booster versus hydraulic booster braking. In some embodiments, older model cargo tractors may require more work to make autonomous as entire systems may need to be updated to support any level of autonomous control. Additionally, those skilled in the art will appreciate that performance of refitted GSE (such as cargo tractors or tugs) may vary depending on the original technology within the vehicle.

Those skilled in the art will appreciate that drive-by-wire is commonly considered the electronic system found in vehicles replacing hydraulic linkages. Maintaining speed via adaptive cruise control and overriding the driver for active collision avoidance systems requires electronic control of throttle, brakes, shifting, and steering. This electronic control is a necessary component of vehicle safety and collision avoidance systems. Embodiments of autonomous cargo tractors use this electronic control system as a retrofit type of control system that may sent critical electronic signals to vehicle systems such as the engine and braking—two systems normally controlled by human hand interaction with the steering wheel and foot interaction with pedals. In order to assure accurate electronic response, such a retrofit control system uses feedback, such as the actual speed of the vehicle, the actual and precise steering angle, and current engine status all of which can be provided by sensors. An embodiment may implement a vehicle dynamics control computer (e.g., as a control processor) and a data preprocessing control computer (e.g., as another control processor) as part of such a retrofit control system to control actuators and sensors which in turn control independent vehicle systems to meet vector requirements defined by a given heading and speed.

Figure 1B:
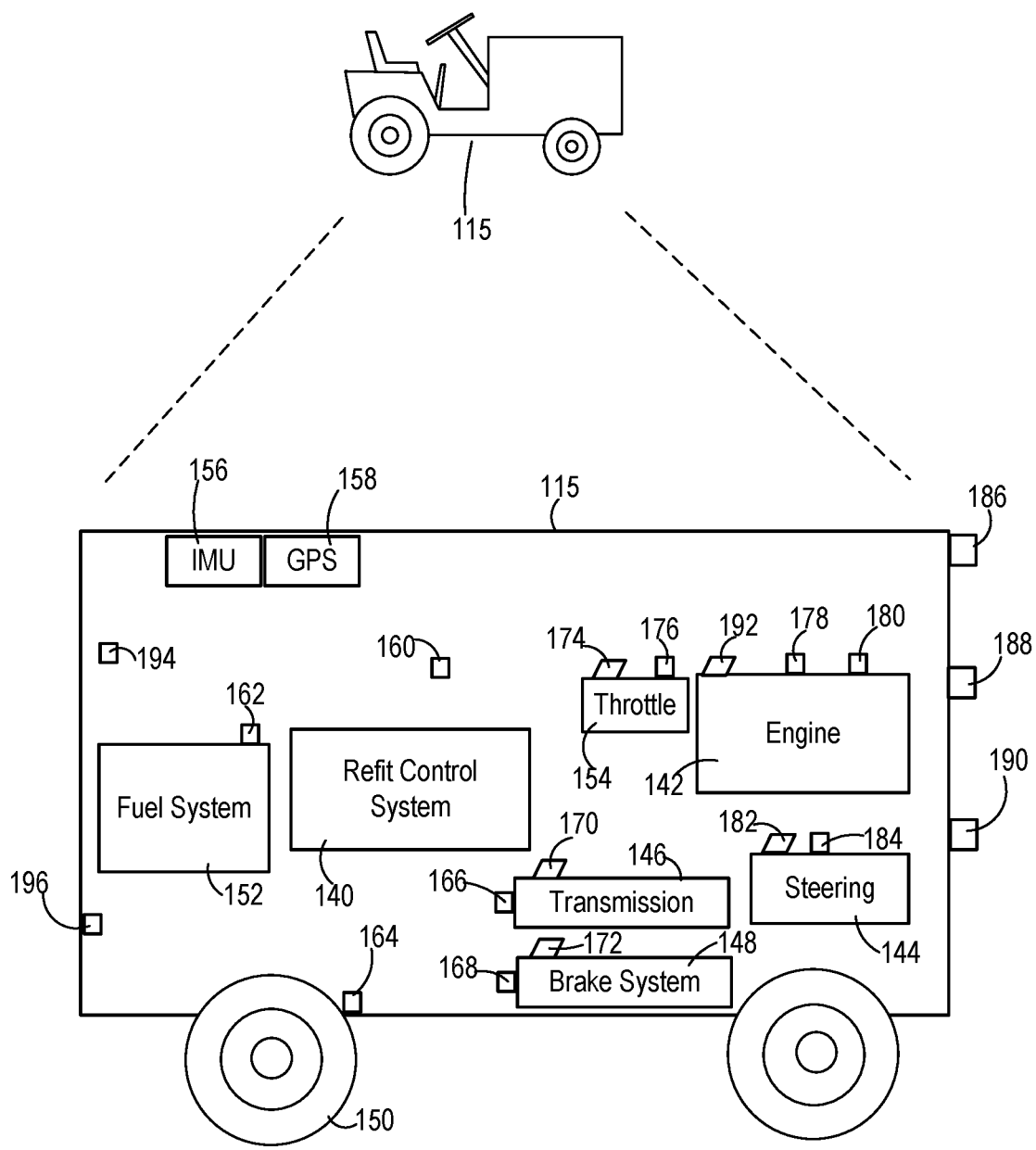
FIG. 1B is a diagram illustrating further details of the exemplary logistics ground support equipment that uses a retrofit assembly apparatus for enhanced autonomous operation as shown in FIG. 1A in accordance with an embodiment of the invention.

FIG. 1B is a diagram illustrating further details of components of exemplary logistics ground support equipment (e.g., exemplary cargo tractor 115) configured with an exemplary retrofit assembly apparatus for enhanced autonomous operation in accordance with an embodiment of the invention. Exemplary cargo tractor 115 is illustrated with various control elements of the tractor 115 as well as with various control, sensing, and actuation components of an exemplary retrofit assembly that may be used to refit tractor 115 so as to allow for and enhance a level of autonomous operation of tractor 115. Referring now to FIG. 1B, the block diagram portion illustrating exemplary cargo tractor 115 includes wheels 150, an engine 142, throttle 154, fuel system 152, transmission system 146, steering system 144, and brake system 148. The exemplary retrofit assembly shown in FIG. 1B is based around an exemplary refit control system or module 140 attached to tractor 115 and which may be implemented with vehicle dynamics control processor and a data preprocessing control processor based systems.

Exemplary internal or proprioceptive sensors of the exemplary retrofit assembly shown in FIG. 1B include an operator detection sensor 160 (also referred to as a driver present sensor), fuel level sensor 162, wheel speed sensor 164, steering angle sensor 184, transmission status sensor 166, brake sensor 168, throttle position sensor 176, engine crank/run status sensor 178, engine RPM sensor 180, temperature sensor 194, and weight sensor 196. Exemplary fuel level sensor 162 generates sensor data reflecting a detected fuel level in fuel system 152. Exemplary wheel speed sensor 164 generates sensor data based upon monitoring rotational speed of wheel 150 relative to tractor 115. Exemplary steering angle sensor 184 generates sensor data based upon monitoring an angle at which a steering wheel on tractor 115 (part of the steering system 144) has been turned. Exemplary engine crank/run status sensor 178 generates sensor data based upon monitoring whether the engine 142 has been cranked or activated and is running. Exemplary throttle position sensor 176 generates sensor data based upon monitoring a position of throttle 154 disposed on the tractor 115 and coupled to engine 142. Exemplary brake status sensor 168 generates sensor data based upon monitoring motion of a brake pedal (e.g., a part of brake system 148) disposed on tractor 115. Exemplary engine RPM sensor 180 (also referred to as an engine revolution sensor) generates sensor data based upon monitoring engine revolutions of engine 115 disposed on the tractor 115 and is indicative of the current power produced by engine 142. Exemplary operator detection sensor 160 generates sensor data based upon monitoring at least one of an operators presence on the tractor 115 (e.g., detected weight on an operator's seat), the operator's ingress into tractor 115 (e.g., breaking a beam at an ingress point on tractor 115), and the driver's egress from the logistics ground support equipment (e.g., breaking a beam at an egress point on tractor 115). Exemplary transmission status sensor 166 generates sensor data based upon monitoring a status of transmission system 146 (e.g., the state of gear for the transmission). Exemplary temperature sensor 194 monitors a temperature related to the tractor 115 (e.g., an ambient temperature on or near tractor 115). Exemplary weight sensor 196 monitors a weight of cargo being transported by tractor 115 (e.g., a weight bearing on a towing receiver on tractor 115, a weight of cargo as disposed on any dolly being pulled by tractor 115, and the like). These proprioceptive sensors are each coupled to the retrofit assembly's control system 140 where respective sensor data generated may be used by processing circuitry on control system 140.

Exemplary exteroceptive sensors of the exemplary retrofit assembly shown in FIG. 1B include exemplary inertial measurement unit (IMU) 156, GPS receiver 158, LiDAR 186, camera 188, and radar 190. These exteroceptive sensors are also each coupled to the retrofit assembly's control system 140 where respective sensor data generated may be used by processing circuitry on control system 140.

Exemplary actuators shown in exemplary retrofit assembly of FIG. 1B include exemplary throttle actuator 174, brake actuator 172, transmission actuator 170, steering actuator 182, and engine actuator 192. Exemplary throttle actuator 174 responsively controls throttle 154 to cause a change in speed of tractor 115 according to control signals from control system 140. Exemplary brake actuator 172 responsively controls brake 148 (e.g., a brake pedal or brake pad of system 148) to cause the brake 148 to decrease the motion of the tractor 115 according to control signals from control system 140. Exemplary transmission actuator 170 responsively controls transmission system 146 to cause a change in gear selection for the transmission system 146 that alters the motion of the tractor 115 according to control signals from control system 140. Exemplary steering actuator 182 responsively controls steering system 144 to cause a change in position for a steering wheel of the steering system 144 that alters a direction of movement for the tractor 115 according to control signals from control system 140. Exemplary engine actuator 192 responsively activates and deactivates engine 142 on tractor 115 (e.g., starts the engine to allow for movement of tractor 115 or shuts down the engine to prevent further movement of tractor 115) according to control signals from control system 140.

Figure 2:
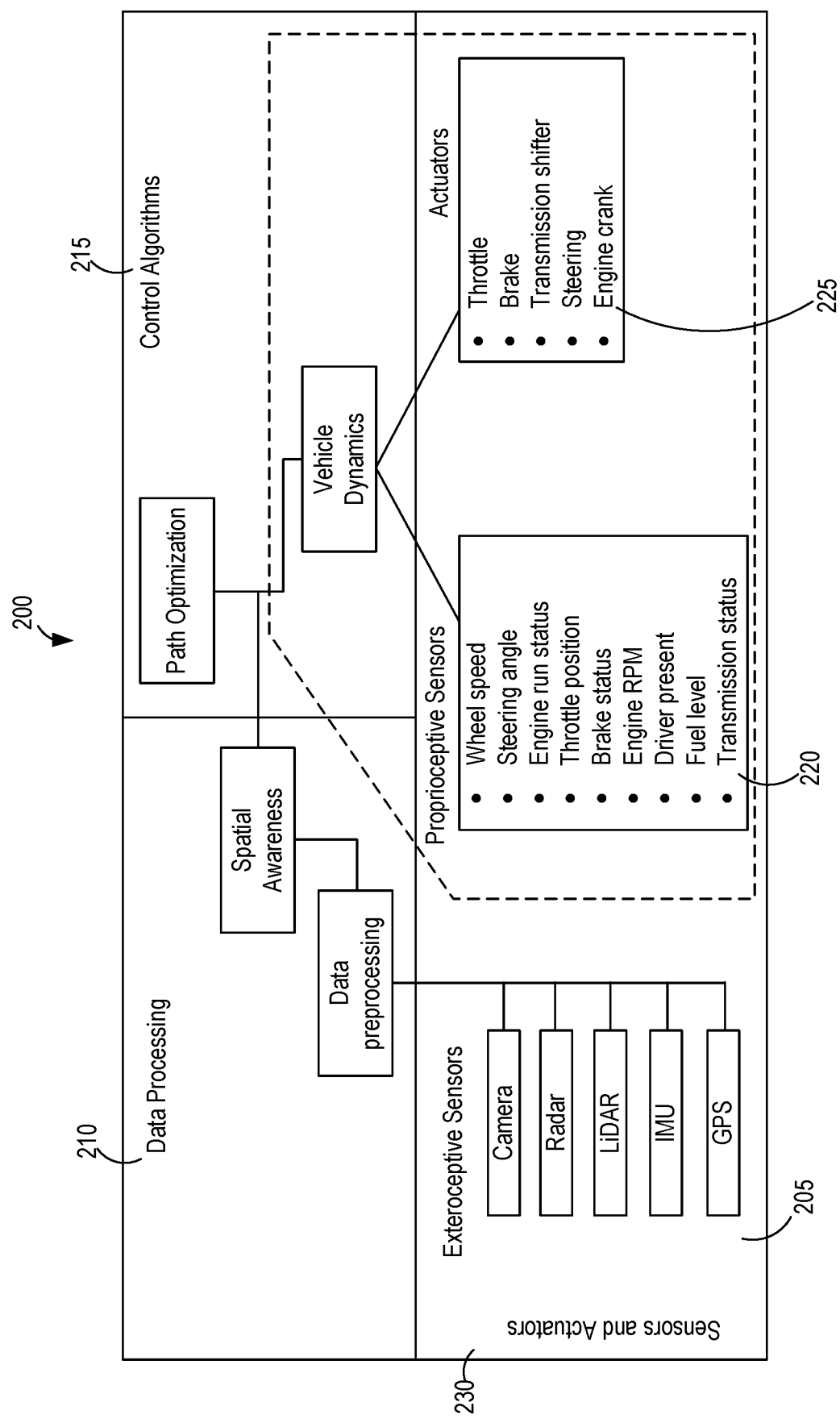
FIG. 2 is exemplary high level function block diagram for an exemplary retrofit assembly apparatus used on logistics ground support equipment for enhanced autonomous operation in accordance with an embodiment of the invention.

FIG. 2 is exemplary high-level function block diagram for an exemplary retrofit assembly apparatus or system used on logistics ground support equipment for enhanced autonomous operation in accordance with an embodiment of the invention. Referring now to FIG. 2, an embodiment of an exemplary refit or retrofit assembly 200 comprises three main parts: 1) hardware components, such as the vehicle itself, sensors, and computer hardware, 2) a vision subsystem, composed of video data processing and range data processing, and 3) a reasoning subsystem. Each of these three integrated systems are represented in FIG. 2 via the Sensors and Actuators 205, the Data Processing 210, and the Control Algorithms 215 respectively.

As shown above in FIGS. 1B and 2, an embodiment may deploy and use sensors that are proprioceptive sensors 220 and exteroceptive sensors 230. In general, exemplary proprioceptive sensors 220 are self-monitoring sensors that are responsible for monitoring self-maintenance and controlling internal status. These sensors 220 are typically found in robots and other autonomous equipment where the signal is used for measuring a specified component of the system. The signal, or transmitted sensor data, is then used by the autonomous equipment to monitor such systems as battery or fuel level, heat and/or general temperature of critical areas and surroundings, and location and directional vectors of moving components. The proprioceptive sensors 220 referenced in FIG. 2 (where examples are used as components of an exemplary retrofit assembly apparatus for tractor 115 to provide and enhance a level of autonomous operation of tractor 115) include sensors that monitor some of the areas an exemplary C-TAR system embodiment, which then may be used as data considered in relation to AI decision making, as explained in more detail below:

Wheel speed—The rotational speed at which a tire/wheel 150 moves relative to the vehicle 115 will be measured in order to determine actual vehicle speed relative to the ground.

Steering angle—Shaft or rotary encoders are a type of device that could be used to provide the angle at which the steering wheel of steering system 144 has been turned. Rotary encoders are electro-magnetic devices that work as a transducer to convert the angular position of a shaft of axle to an analog or digital code. This angle provides feedback on the turn angle the cargo tractor 115 is expected to make.

Engine run status—Sensors 178 will provide feedback from the engine 142 regarding whether or not it is running or active.

Throttle position—A throttle position sensor 176 or TPS is used to monitor the throttle position of tractor 115 and is usually located on a butterfly spindle/shaft. A TPS sensor directly monitors position on vehicles that do not utilize drive-by-wire systems. For the cargo tractors that do utilize drive-by-wire, an embodiment may use an electronic throttle control or ETC to provide position data in a feedback loop as the sensor data generated by sensor 176.

Brake status—Brake pedal position sensors 168 are electromechanical sensors that detect motion of a brake pedal (or other part of brake system 148). That motion and sensor feedback will likely vary based on the hydraulic brake configuration and age of the cargo tractor being retrofit and so sensors on the individual brake pads may be required in some embodiments. The force needed to create the same amount of brake pad friction will likely vary between cargo tractors.

Engine revolutions per minute (rpms)—The speed at which the engine 142 is moving is feedback that may be captured using an effect sensor (e.g., RPM sensor 180) that detects magnetism generated by the voltage through the sparkplug. Using a proximity sensor (e.g., another exemplary implementation of RPM sensor 180) to detect the speed of a rotating piece of machinery off of the engine 142 is another possible solution to gauge rpms and speed of tractor 115.

Driver present—Presence detection sensors (e.g., operator detection sensor 160) that can be placed on or in the seat of cargo tractor 115 to determine a driver's ingress and egress from the vehicle 115. These sensors can also be utilized to determine when passengers are present.

Fuel level—Ultrasonic and/or capacitive fuel level sensors (e.g., exemplary implementations of fuel level sensor 162) can be integrated with the fuel tank 152 in order to capture information on all fuel types such as gas, diesel, and other bio fuels that may be put into the cargo tractor 115.

Transmission status—Transmission control shift timing, transmission input speed, transmission output speed, and other data created by the transmission and powertrain in transmission system 146 are variables that will be captured via sensor 166 in order to relay information back to the C-TAR unit (e.g., retrofit control module 140). In modern vehicles at least, an automatic transmission control unit or TCU may receive electronic data from all of the associated transmission sensors and uses that information to determine how to calculate when the change of gears should occur for things like optimum performance and fuel economy. For cargo tractor 115, this type of data may be gathered using sensor 166 into the C-TAR control module 140 for decision making purposes either through tapping into existing transmission sensors or through the addition of more electronic sensors on important movement parts within the drivetrain/transmission system 146.

In addition to such exemplary internal sensors used to gather feedback and data regarding the control functions of the cargo tractor 115 (referenced as proprioceptive sensors 220 in FIG. 2), additional external sensors (referenced as exteroceptive sensors 230) retrofitted to tractor 115 via the C-TAR package gather data on the surrounding environment. The exemplary list provided here represents some of the potential sensors that could be used in an embodiment.

Camera—An embodiment may use a single or multiple cameras (e.g., such as exemplary camera 188) for forward obstacle and vehicle detection, lane detection, and traffic sign recognition (either at standard sign height or presented on the road itself such as a stop sign on the tarmac). Exemplary cameras, such as camera 188, may be mounted at multiple points in the front of the cargo tractor 115 and behind the body for sideway views, parking and backing up, as well as traffic intersection detection. The cameras themselves may acquire images in a free-running mode with the situation determining whether or not images and data should be stored internally/externally for AI processing. An embodiment may use Firewire, USB 3, or some other high-speed data bus to create an interface between the cameras and any onboard vision system that is part of control module 140. Stereo algorithms may be used to reconstruct the 3D environments and provide information about the immediate surroundings either to the primary refit cargo tractor 115 or to any other cargo tractors existing on the autonomous vehicle network (e.g., other logistics ground support equipment in wireless communication with tractor 115 via a wireless transceiver in module 140).

Radar—Radar, such as mm-wave scanning radar technology, may be deployed using a radar sensor (e.g., exemplary radar 190) in an embodiment as an option for collision avoidance especially when the environment is obscured with smoke, dust, and weather. Functioning without issue during all potential weather and obstruction type events is desired for the C-TAR and the refit cargo tractor 115. As with mainstream vehicles, radar systems could be installed on the front and back of the cargo tractor 115 warning the AI (e.g., the control systems in module 140) or a human driver of impending impact via feedback on a user interface (e.g., visual information on a display on a dashboard of tractor 115, audible information through a speaker on tractor 115, and the like) or by actually engaging the brakes 148. Other use cases for exemplary radar sensors 190 include creating an adaptive cruise control that always takes into account the movement of other vehicles around the cargo tractor 115.

LiDAR—LiDAR is similar to radar with the difference being that this type of sensor uses laser detection rather than radio. A LiDAR sensor (e.g., exemplary LiDAR sensor 186) may be used on an embodiment of refit cargo tractor 115 for obstacle detection and avoidance to navigate safely through environments. LiDAR sensors could be used to create cost maps or point cloud outputs (e.g., multi-dimensional map data) that provides data for software running on control module 140 to determine where potential obstacles exist in the environment relative to tractor 115 and where the semi- or fully autonomous cargo tractor 115 is in relation to those potential obstacles. LiDAR could also be used for adaptive cruise control.

IMU (Inertial Measurement Unit)—IMUs (e.g., exemplary IMU 156) may be used to measure and report on a vehicle's location, velocity, orientation, and gravitational forces when deployed as part of a refit GSE (i.e., a logistics ground support equipment with an exemplary retrofit assembly apparatus to provide and enhance autonomous operation of the GSE). In one embodiment, the application for ground autonomy could be such that the integrated accelerometers, gyroscopes, and magnetometers within the IMU 156 may be used in place of GPS 158 when a strong communication signal is not available (such as within tunnels, buildings, and when electronic interference is present). Those skilled in the art will appreciate that an IMU (such as IMU 156) may allow computing systems in module 140 to track the cargo tractor's position using a method called dead reckoning. Given that the cargo tractor 115 (or other GSE) refit with C-TAR may spend large portions of their operational time under large craft, inside buildings, hidden by significant weather, and around a high amount of wireless communication traffic such as 802.11, Bluetooth, and cellular, embodiments may deploy an IMU 156 to aid in keeping exact positioning.

GPS (Global Positioning System)—For the times when an embodiment of refit cargo tractor 115 is out in the open and not impeded by obstruction, electronic noise, weather and other communication limiting environmental factors, exemplary GPS 158 may be used by refit cargo tractor 115 to provide location data representing current positioning of the tractor 115. Those skilled in the art will appreciate that GPS 158 on a semi- or fully autonomous cargo tractor 115 may use real time geographical data received from several GPS satellites to calculate longitude, latitude, speed, and course. In an embodiment, routes could be preprogrammed into the C-TAR (e.g., refit control system module 140) so that known coordinates could be utilized without human control or to assist human control by making virtual barriers in certain locations improving safety and decreasing damage to the tug or its environment. In further embodiments, GPS 158 could be used to track all movements of human drivers/operators or provide optimal routes based on process requirements, time of day, special sort constraints, or any other airport/logistics regulation.

FIGS. 5 and 6 provide information on exemplary evaluations of sensors considered for use in various embodiments. All sensors should be considered as options for performing collision avoidance detection and environmental data collection in embodiments of the invention. Exemplary table 500 shown in FIG. 5 provides information on different exemplary sensors in accordance with an embodiment of the invention where the information in table 500 provides examples of different types of passive and active sensors and an exemplary comparison of sensing tasks, compatibility, integrations and cost aspects when considering deployment in C-TAR embodiments using exemplary retrofit assembly apparatus may be deployed on GSE. FIG. 6 is an exemplary table 600 provides exemplary information on exemplary sensor tasks for a combination of exemplary sensors in accordance with an embodiment of the invention.

FIGS. 1B and 2 show different exemplary actuators used as part of an embodiment of a retrofit assembly apparatus for use on tractor 115 (e.g., an exemplary logistics ground support equipment) to enhance a level of autonomous operation of the tractor 115. In general, an actuator may be considered a type of motor that is responsible for moving and or controlling a mechanical system of some type. Actuators can be operated by many different means including electric current, hydraulic fluid pressure, or pneumatic pressure which is there process to convert energy of some kind into motion or apply some form of force. The most common types of actuators are cylindrical that perform piston movement once energy is applied. Grippers are another type of robotics actuators but given the functions that may be performed within a cargo tractor 115 via C-TAR, piston or piston-like actuators may be deployed in some embodiments. The following provides further information on anticipated types of exemplary actuators that may be used in embodiments of C-TAR systems with a retrofit assembly apparatus for use on tractor 115 to enhance and provide a level of autonomous operation of the tractor 115:

Throttle—Linear or rotary actuators may be used to implement throttle actuator 174 for controlling throttle 154 of engine 142, which may be used in the physical refit of cargo tractors (such as tractor 115) to control fluid flow of the inlet gases into engine 142. The type of solution will be dependent on if the cargo tractor is drive-by-wire or basic hydraulic linkages and how much control at the point of the gas pedal needs to be provided. The drive-by-wire configuration allows for greater control and more precise movements of the throttle whereas hydraulic linkages will cause a greater level of variance. Diesel engines typically implement throttle control by regulating the fuel flow into the engine. In an embodiment, the refit cargo tractor 115 may become a hybrid autonomous vehicle after the refit because humans will still be capable of controlling the throttle.

Brake—Primary brake actuation may, in an embodiment, be provided by a linear actuator (e.g., a type of brake actuator 172) that attaches to the frame of tractor 115 and directly moves a manual brake arm (e.g., by either pushing or pulling the brake pedal toward the floorboard of tractor 115). In an embodiment, potentiometers within the linear actuators could be used to provide feedback and absolute position. Additionally, a separate hydraulic brake actuator could be used to implement brake actuator 172. As with the throttle and gas pedal, an embodiment may have humans being still be allowed control of and access to the brake pedal given that an embodiment of such a C-TAR solution may allow for hybrid autonomy.

Transmission shifter—Depending on the cargo tractor model, the transmission may be either manual or automatic. Automatic shifter actuators (e.g., a type of transmission actuator 170) may incorporate positional feedback of any of the gear selector choices (e.g., park, reverse, neutral, drive, etc.). For manual transmissions shifters, an embodiment may use a servomotor as transmission actuator 170 to replace the existing gearshift mechanism, thereby allowing for a more automatic control. Again, an embodiment may have humans being still be allowed control of and access to the transmission shifter given that an embodiment of such a C-TAR solution may allow for hybrid autonomy.

Steering—Steering can be controlled by a servomotor and controller (e.g., a type of steering actuator 182), which directly drive the steering column where it attaches to the steering wheel as part of steering system 144. This allows the human to still control and drive the cargo tractor when it is not in a full autonomy control mode. Feedback from the motor to the steering wheel servomotor and controller could be provided by hall sensors and/or encoders and a control position sensor could provide absolute position feedback.

Engine crank (crankshaft)—Using internal actuators as engine actuator 192 to crank and turn off the engine 142 may be used in an embodiment as humans may still need external access to the key receptacle for when the cargo tractor 115 is in a hybrid autonomous state.

Figure 3:
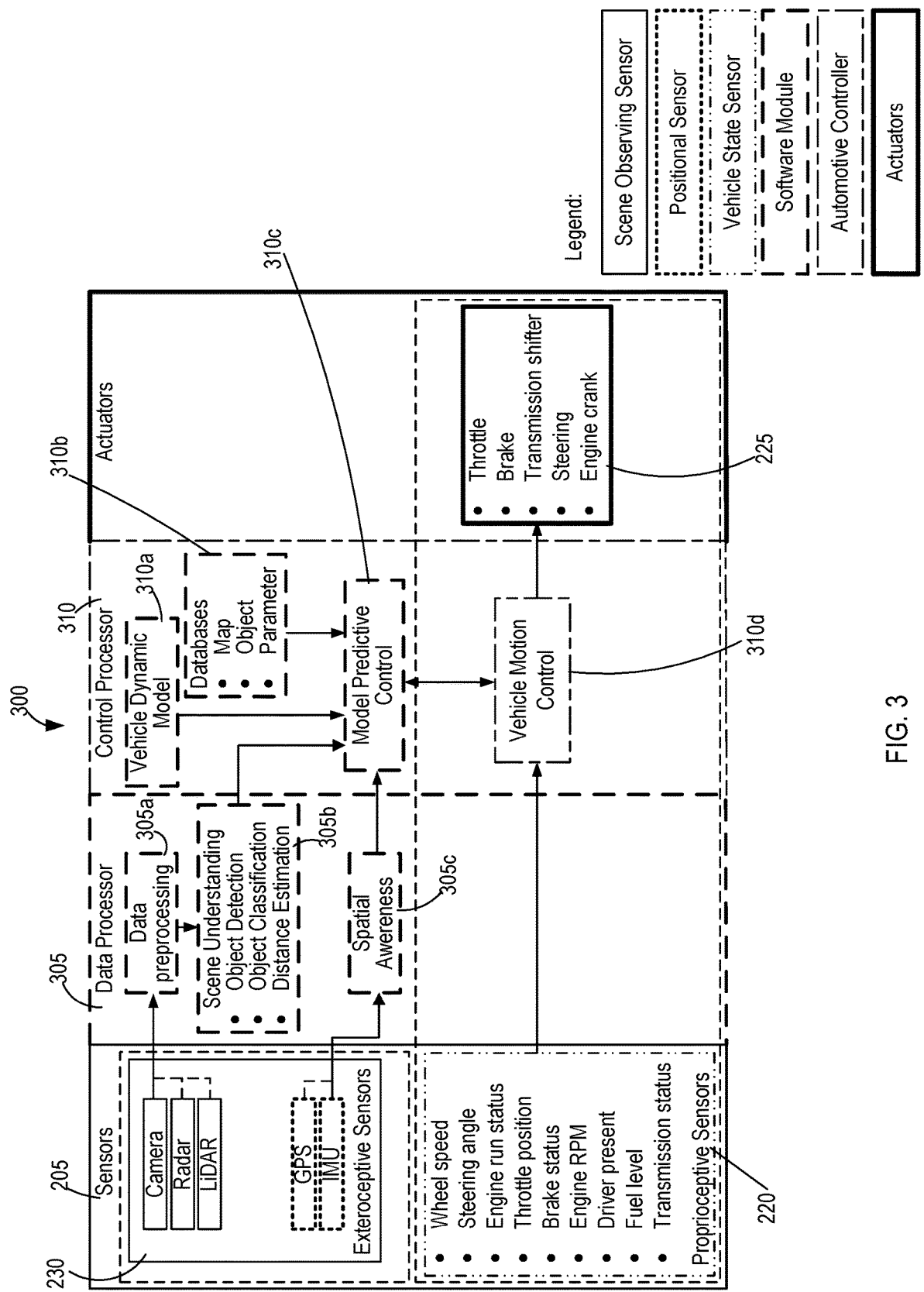
FIG. 3 is a more detailed diagram of an exemplary retrofit assembly apparatus used on logistics ground support equipment for enhanced autonomous operation shown with logical segmentation of different elements and roles within the apparatus in accordance with an embodiment of the invention.

In general, exemplary embodiments of refit components for such a refit or retrofit assembly apparatus for use on a logistics ground support equipment to enhance a level of autonomous operation of the logistics ground support equipment may include, but are not limited to, a microprocessor-based control board that serves as an onboard computer (with memory, interface circuitry, and in some embodiments GUI elements (e.g., graphics interfaces and one or more displays). Such a control board may be implemented with a single processor or multiple processors (such as shown in FIG. 3) and software modules that programmatically adapt each of the processors to be unconventionally operative to operate as components of the assembly beyond that of a generic computing device performing well-known, routine, or conventional functions as the control board (e.g., exemplary control system 140) component of the assembly. In an exemplary embodiment, the control board may be implemented using open-source solutions such as Raspberry Pie and Arduino boards that provide cost effective and small format computing based control boards that may be programmatically configured to provide unconventional, new, non-routine functionality when deployed in the embodiment. Further information on exemplary control board implementations appears in Table 700 shown in FIG. 7. Embodiments of exemplary control board (e.g., exemplary control system 140) may be implemented with a light weight, real-time operating system (RTOS). The exemplary RTOS may be based on constraints such as RAM, storage size, and interrupt handling which ultimately speaks to the speed of the solution and how quickly it can be programmed to make quick yet complex decisions based on quickly received data in order to safely and semi-autonomous control cargo tractors and other GSE. Those skilled in the art will appreciate that an exemplary RTOS for the controller board may include, for example, QNX, various flavors of Linux, and Xenomai.

Consistent with the description above, the control board (e.g., exemplary control system 140) generally interfaces and operatively connects to one or more sensors (also referred to as a sensor module with one or more sensors, sensing elements, or an array of similar or different sensors). These sensors (e.g., exteroceptive sensors) provide generated sensor data so that the control board, when operating one or more programs, may collect and analyze the sensor-based data being generated on the GSE vehicle being refit. In an embodiment, the control board device will be responsible for controlling braking as well as governing the throttle and the speed of the cargo tractor (or other piece of GSE) through actuators (e.g., exemplary actuators 225). This controlled actuation may be based upon the analysis of sensor and other environmental data that may include, for example, GPS data, Light Detection and Ranging (LiDAR) data, Inertial Measurement Unit (IMU) data, Radar data, and camera input data as types of exemplary sensor/environmental data. The sensor module or data logger that collects the actual digital and analogue input may physically connect to the control board via protocols (e.g., USB, GPIB, serial protocols, or other networking/data communication protocols) or using wireless connections like Bluetooth, ZigBee, NFC, WiFi, cellular, or the like.

FIG. 3 is a more detailed diagram of an exemplary retrofit assembly apparatus used on logistics ground support equipment for enhanced autonomous operation shown with logical segmentation of different elements and roles within the apparatus in accordance with an embodiment of the invention. Referring now to FIG. 3, exemplary system 300 implementing an exemplary retrofit assembly apparatus is shown with four primary components: exemplary sensors 205 (e.g., exemplary exteroceptive sensors 230 and exemplary proprioceptive sensors 220 as describe above relative to FIGS. 1B and 2), an exemplary data preprocessing control processor 305, an exemplary vehicle dynamics control processor 310, and exemplary actuators 225 (e.g., exemplary actuators 225 as described above relative to FIGS. 1B and 2). Using these components, exemplary system 300 may implement a technical solution with enhanced autonomous retrofit operations on a logistics ground support equipment (e.g., tractor 115) that provides a refit hardware and sensor package; environment awareness using such a system 300; logic and software for calculations, data acquisition, and responsive control of the logistics ground support equipment for a level of autonomous operation; and physics-based determinations of paths for trailing equipment (e.g., one or more dollies 120).

As shown in FIG. 3, exemplary system 300 deploys exemplary data preprocessing control processor 305 with various software modules, such as a data preprocessing module 305a, a scene understanding module 305b, and a spatial awareness module 305c. In general, exemplary data preprocessing module 305a receives sensor data input from exteroceptive sensors 205 (e.g., camera 188, radar 190, LiDAR 186) where the sensor data may be processed to eliminate discrepant data using the data preprocessing control processor 305. Exemplary scene understanding module 305b may then receive the processed sensor data from data preprocessing module 305a, where the scene understanding module 305b identifies objects, classifies objects identified, and estimates distances to identified and classified objects to generate at least relevant depth information relative to the current state of the logistics ground support equipment (e.g., the retrofit tractor 115). Exemplary spatial awareness module 305c generates spatial awareness information relative to the current state of the logistics ground support equipment (e.g., the retrofit tractor 115) based upon sensor data input from GPS 158 and/or IMU 156.

As shown in FIG. 3, exemplary system 300 deploys exemplary vehicle dynamics control processor 310 with various software modules, such as a vehicle dynamics model 310a, databases 310b (with map, object, and vehicle operating parameter information), and a model predictive control (MPC) module 310c. In operation, the exemplary vehicle dynamics control processor 310 executes these software modules to access information from vehicle dynamics model 310a and databases 310b, receive the generated depth and spatial awareness information from exemplary data preprocessing control processor 305, and receive sensor data from proprioceptive sensors 220, determine an optimized path for retrofit tractor 115, and activate one or more of actuators 225 according to the optimized path determined that autonomously alters motion of the refit tractor 115.

Figure 13:
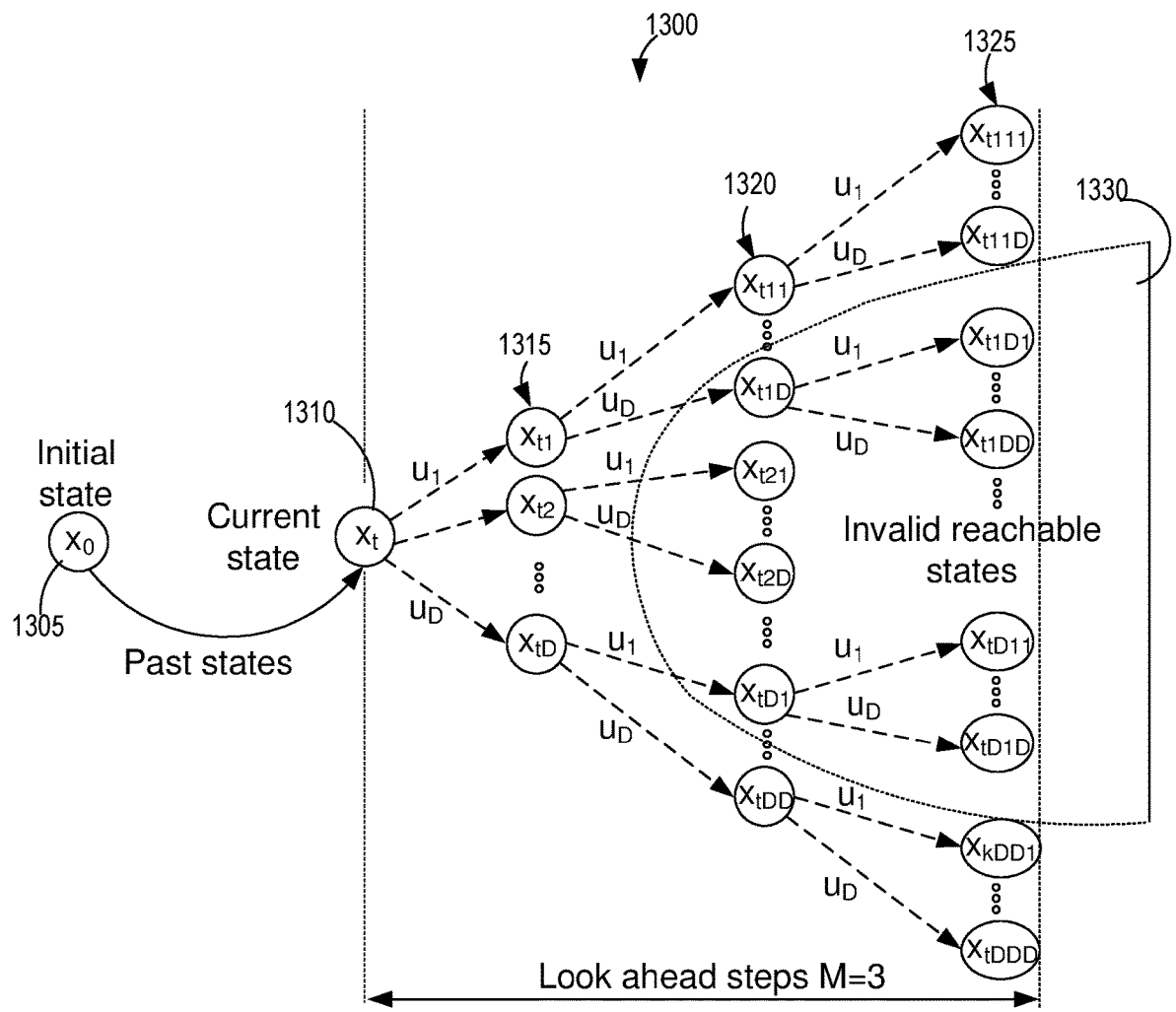
FIG. 13 is a diagram of an exemplary search tree for predictive control using three look-ahead steps in accordance with an embodiment of the invention.

In more detail, an embodiment of exemplary model predictive control (MPC) module 310c may determine control solutions to determine GSE movement (e.g., the maximum allowable speed) at a discrete moment in time/space related to an optimized path. More particularly, an embodiment of the MPC 310c may employ a look-ahead policy (e.g., exemplary look-ahead steps 1315, 1320, and 1325 illustrated in FIG. 13 relative to a current state 1305 of the GSE) and is applicable to discrete event management using supervisory control. In FIG. 13, an exemplary search tree diagram 1300 for predictive control is shown an initial state 1305 is shown as an exemplary past state of the GSE and where the GSE has moved to current state 1310. An embodiment of exemplary MPC 310c may predict different reachable states under different operative control conditions (e.g., speeds, direction, etc.) so as to then consider and evaluate such states and whether they may be considered invalid reachable states (e.g., within the envelope 1330 where, for example, a predicted location of an environmental object lies or where an operational rule (such as a turning radius limit or speed limit based on location) is inconsistent with the state). In other words, an embodiment of exemplary MPC 310c may calculate possible control outcomes for the set of control inputs over a limited prediction horizon. With a performance evaluation function (also referred to as a "cost" function related to a performance metric), an embodiment of the MPC 310c may predict and evaluate reachable system states in the aforementioned prediction horizon (e.g., as illustrated with states 1325 shown in FIG. 13) such that an optimal outcome can be found (e.g., a path may be determined without being an invalid reachable state 1330), and the corresponding system control input can be selected and provided via vehicle motion control 310d to one or more of actuators 225. For example, in one embodiment, the use of "optimal" may mean the predicted control solutions along the most realizable path for collision avoidance which results in the least limiting of vehicle speed while ensuring collision are prevented. This process may repeat until a predefined objective is reached, such as system 300 operating in a safe zone away from passive beacons 105a-105d and other obstacles (e.g., detected environmental objects, such as other vehicles, humans, and the like). The vehicle dynamics control processor 310 part of the exemplary system 300 includes a vehicle motion control software module 310d that implements a vehicle actuation feedback control system using the vehicle dynamics information 310a and operating as a feedback compensator to provide input to vehicle actuators 225 (such as actuators for the cargo tractor's throttle 154 and/or braking system 148 and/or a gear selector on transmission system 146 on the cargo tractor 115).

Figure 4:
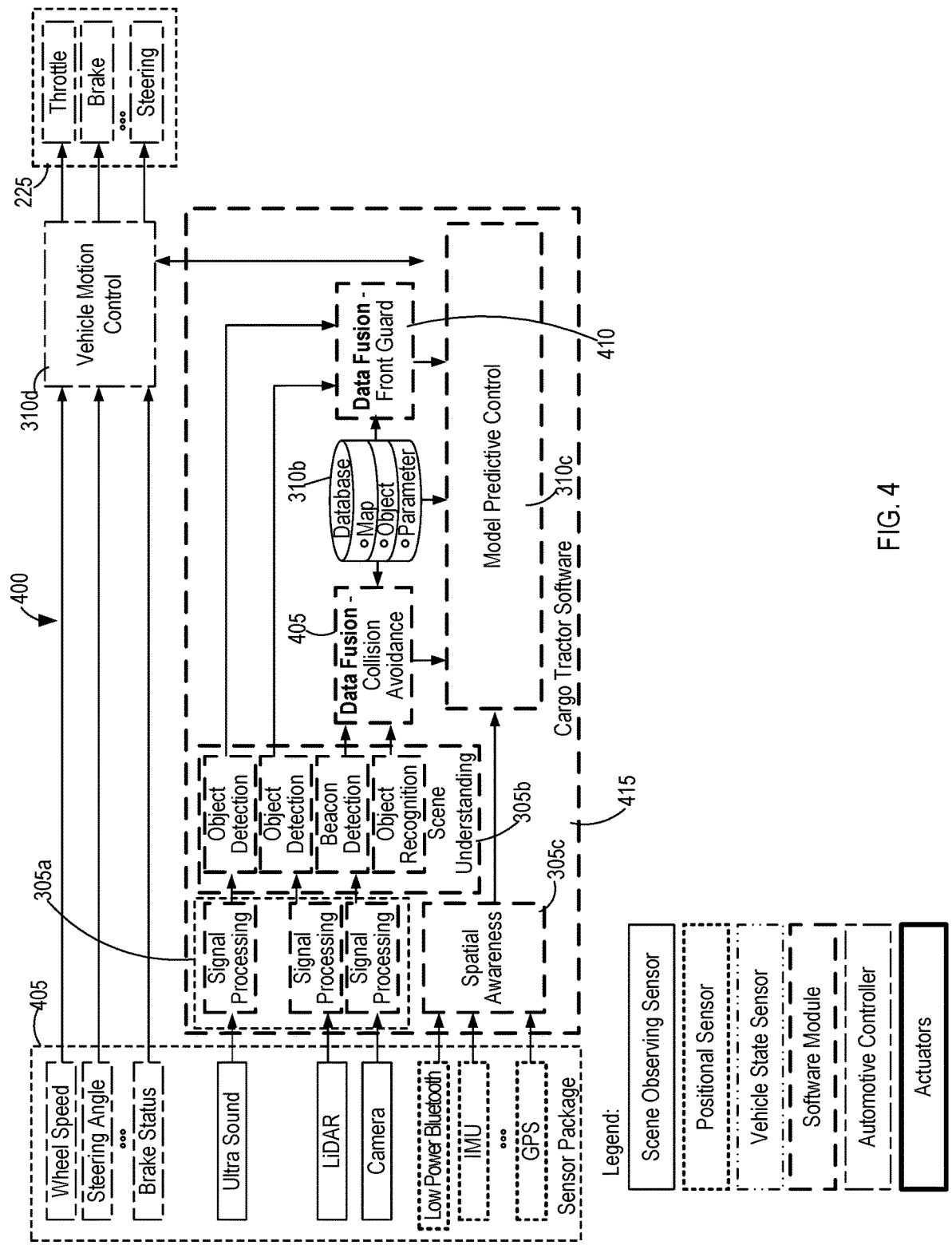
FIG. 4 is a diagram of exemplary implementation details for parts of an exemplary retrofit assembly apparatus used on logistics ground support equipment for enhanced autonomous operation in accordance with an embodiment of the invention.

FIG. 4 is a diagram of exemplary implementation details for parts of an exemplary retrofit assembly apparatus used on logistics ground support equipment for enhanced autonomous operation in accordance with an embodiment of the invention. As shown in FIG. 4, similar processing functionality as described above with respect to FIG. 3 is shown in a logical arrangement with an exemplary sensor package 405 (e.g., sensors that include exteroceptive (including an ultrasound sensor 420 and a low power Bluetooth sensor 425 in addition to others described above) and proprioceptive sensors). Exemplary vehicle motion control module 310d is shown receiving inputs from various proprioceptive sensors as well as input from the MPC 310c. As shown in FIG. 4, exemplary MPC 310c (as part of the exemplary software modules 415 operating as part of system 400 on refit control system 140) takes sensor data input from exteroceptive sensors in sensor package 405. Modules 415 process the sensor data using signal processing modules 305a for pre-processing sensor data from ultrasound sensor 420, LiDAR 186, and camera 188. Exemplary scene understanding module 305b then uses the preprocessed sensor data with object detection code processing sensor data from ultrasound sensor 420 as preprocessed by module 305a, with object detection code and beacon detection code processing sensor data from LiDAR sensor 186, and with object recognition code processing image data from camera 188. Spatial awareness module 305c generates spatial awareness information relative to the current state of the logistics ground support equipment (e.g., the retrofit tractor 115) based upon sensor data input from low power Bluetooth sensor 425, GPS 158 and IMU 156 in sensor package 405. Exemplary data fusion modules 405, 410 may take object detection information, beacon detection information, and object recognition information from module 305b along with information from databases 310b to provide inputs to MPC 310c. MPC 310c then provides its output to vehicle motion control module

310d, which may generate relevant actuator control signals in order to activate one or more of actuators 225 according to the optimized path information generated by MPC 310c.

In some situations, data captured from the real world may be considered dirty (noisy) and incomplete as it may lack attribute values, certain attributes of interest, and only contain aggregate data or errors and outliers. By having exemplary C-TAR retrofit assembly apparatus on a tractor 115 and the larger robotic AI functionality of refit control system 140 perform data preprocessing (e.g., as performed using data preprocessing module 305a running on data preprocessing control processor 305), inconsistent and discrepant data could be eliminated thereby only leaving what's needed for movement and other autonomy related functions. In an embodiment, knowledge discovery on the part of the robotic AI may be a potential output as data preprocessing includes cleaning, normalization, transformation, feature extraction, selection, etc.

In some embodiments, LiDAR 186 and other similar exteroceptive sensors 230 may also be used to provide data for depth and spatial awareness for an exemplary C-TAR system and the AI component of the refit cargo tractor (e.g., have such sensor data fed to spatial awareness module 305c for determining depth and spatial awareness information). From a spatial awareness perspective, some embodiments may update frequently so that awareness stays sufficiently up to date (given movement considerations) and accurate even during low visibility conditions. GPS 158 may be used to help pinpoint the location and route while one or more cameras 188 look at identified patterns (e.g., repeating patterns) like lane markings and speed limits. Some cameras 188 may, in some embodiments, be used to identify other vehicles, aircraft, road signs, pedestrians, signals, containers, facility walls and components, and anything else that could be found at an airport or logistics facility. Spatial awareness information generated by module 305c may include creating data that could be used by a single autonomous vehicle (e.g., refit tractor 115) or a collection of vehicles by way of a computational "farm", which could make calculations and decisions more quickly than the refit cargo tractor 115 itself. The amount of data captured for true spatial awareness may, in some embodiments, be so large that multiple computers (e.g., multiple processors dedicated for running spatial awareness module 305c and/or scene understanding module 305b) may be used to identify pertinent information and generate depth and spatial awareness information accordingly.

Relative to path optimization, for AI logic used on a control board (e.g., a controller using one or more processors, such as exemplary control system 140) in an exemplary C-TAR retrofit assembly apparatus used on refit tractor 115 to enhance a level of autonomous operation of the tractor 115, efficient real-time autonomous driving motion planning and coordination as well as trajectory optimization may be used and implemented as part of MPC 310c. Based on AI-based cost functions (such as the environments of the airport or other industrial facility, the process being performed, the timeframe requirement, and the safety concerns), the planner defined using path optimization could discretize the plan space and search for the best trajectory for the C-TAR enabled GSE (e.g., refit tractor 115). Then, an iterative optimization may be applied to both the path being driven by the cargo tractor 115 and its speed of the resultant trajectory. In an embodiment, the simplest cost function in path optimization may be considered distance because modifications can be calculated in a two-dimensional plane. For more complex cost functions that involve the manipulation of time and energy in further embodiments, the analysis may be performed in three dimensions. As such, for an exemplary embodiment, a one-dimensional optimization of the motions along a specified transit path and a search for optimal path in the position space could be two separate components that the AI of the autonomous vehicle (e.g., the code in exemplary MPC 310c) calculate in order to reduce complexity.

Embodiments of path optimization on a refit GSE (e.g., a C-TAR retrofit logistics GSE such as refit tractor 115) may, for example, include an awareness of and calculation for multiple components such as time optimization motion along pre-specified paths. This component may focus on maximum acceleration and deceleration at every point. Local optimization is the component of path optimization that finds the path with the minimum time. Sometimes this can be based on complete knowledge of the surrounding layout of the environment (e.g., contextual data used by the onboard controller) or based on a "guess" where past history (e.g., another type of contextual data based on historical information) or unfamiliar conditions may dictate a more preferred movement based on ether human or robotic conservation (e.g., prompted contextual data). Global optimization may consider the entire environment (the entire space in which a refit cargo tractor can traverse) through awareness created by possible technologies such as geo-fencing. Global optimization may also take into account a fleet or swarm of semi- or fully autonomous vehicles in an environment where a master node captures the environmental data and does most of the processing for the individual slave nodes which are in fact the refit cargo tractors themselves. In other words, the master node may be a central computing type of device that communicates, respectively, to different refit cargo tractors.

In an exemplary C-TAR embodiment, the global environment may include paths through covered areas inside buildings. Path optimization may also need to have an awareness of transitioning into and out of buildings where GPS, LiDAR, and other technologies will be limited. The refit tractor 115 may need to understand two distinctly different states: being in an outside uncovered environment and being inside a covered environment. An embodiment may use different safety and process rules to apply under the two different conditions thereby further modifying how path optimization may be accomplished based on such different geographic information (e.g., map information from database 310b).

In an exemplary embodiment, a vehicle dynamics controller (e.g., vehicle dynamics control processor 310 as part of refit control system 140) may be concerned with items like roll, pitch, and yaw as well as vertical, lateral, and longitudinal dynamics via multiple inputs. The areas of a vehicle influenced by vehicle dynamic control may include the front steering 144, brakes 148, engine torque of engine 142, suspensions of the tractor, and active differential for transmission system 146. Because embodiments of the refit cargo tractor 115 may be semi- or fully autonomously controlled, these dynamics systems may be integrated with local and global controller measurements coming from such systems as GPS 158, cameras 188, infrared (another type of exteroceptive sensor), radar 190, LiDAR 186, etc. Thus, an embodiment may deploy an integrated vehicle dynamics controller to take over calculations of position and velocity in a global frame. This may be implemented as part of vehicle motion control module 310d running on vehicle dynamics control processor 310 or as a separate module running on vehicle dynamics control processor 310 or data preprocessing control processor 305.

Various embodiments may be used for a semi- or fully-autonomous robotic vehicular system for an exemplary C-TAR embodiment. For example, this may include single robot, multi-robot, or hybrid systems.

Single robot systems—An exemplary refit cargo tractor, semi- or fully autonomous vehicle, or robotic AI driven device may operate independent of all other autonomous entities. Data captured by one C-TAR refit device would keep that information for processing and learning internally only. While each unit will react accordingly to other units, this reaction will be based on their internal programming and not information being processes by other refit C-TAR cargo tractors. Each unit may build up and store a data repository on the environment, but it will be information that can only be utilized by the unit that created it.

Multi-robot systems—Unlike the single robot systems, an embodiment deploying a multi-robot system may be used to share data amongst all semi- or fully autonomous refit vehicles in the environment. As one refit vehicle learns information about an aspect of their environment, all units may gain that information via a central hub (e.g., master node, central server, or other centralized communication and sharing device) for data and communication. In such an exemplary multi-robot system embodiment, the majority of complex computing may occur in a central location with the results of data processing being transmitted to the individual cargo tractors for instruction and process control. This creates a "hive" AI mentality where a central unit, the master node, is in control of all of the servant nodes. Having complex calculations and data processing occur in a central location lessens the need for more robust computing systems within each C-TAR enabled refit vehicle.

Hybrid systems—Both single and multi-robot implemented systems have benefits and limitations. For instance, a single robot system of cargo tractors could keep equal awareness of all environment whether these refit systems transition into or out of a building or are outside in an open space. However, a refit cargo tractor may remain largely disconnected from the fleet and, as a result, may have to learn the same information even if other cargo tractors in the same environment have already processed complex response and reactionary information. Likewise, multi-robot systems often use a central point of processing and site to observe and control all of the servant nodes. Transitioning into and out of buildings may be very difficult for a multi-robot systems comprised of cargo tractors at a large airport hub that handles a large amount of logistics. Passing into a building in such an environment may cause disruptions as a higher emphasis on technologies like GPS will be required. As such, an embodiment may combine both of these methodologies for vehicle fleet autonomy because each environment of the complex airport hub—outside on the tarmac and inside a sortation facility—may have different requirements, needs, and data for processing.

The state of a complex airport hub operating environment (similar to that shown in FIG. 1A) may be such that many or all GSE are human driven and completely human controlled (with some exception to aircraft 100). One embodiment of C-TAR may be implemented so that human driven cargo tractors operate to complement human decision making and increase safety by preventing actions that would otherwise cause harm or damage. For example, an embodiment of a C-TAR retrofit assembly apparatus for use on GSE may increase safety so that refit cargo tractors never have an impact with humans, aircraft, other vehicles, or anything specified by the robotic AI.

Another advantage of an embodiment may be efficiency. For example, in certain embodiments, the refit cargo tractor may take control from the human in order to marry up the vehicle and dolly string with the loader of an aircraft to prevent plane strikes or poor alignment. When the vehicle does take control from the human, the C-TAR unit (as part of the refit GSE) could provide some type of feedback indication (e.g., visual, audible, or haptic) letting the driver and/or passengers know what is about to happen, why, and when the autonomous control period will end. Communication through any means with humans in the vehicle could be an important component while the cargo tractors are running in a semi-autonomous mode.

Further embodiments may deactivate the autonomous systems of a C-TAR retrofit assembly apparatus for use on GSE based on human/operator/driver detection in the seat or detection of ingress/egress of the human/operator/driver relative to the GSE using an operator detection sensor 160. The refit cargo tractor 115 may be aware of human passengers (e.g., operators, passengers, drivers, and the like) and react accordingly. In some embodiments, full autonomy may not be allowed when a human is present. Only key safety and efficiency systems should be enabled when a person is in the seat. Likewise, no human should be allowed on a refit cargo tractor while it's in full autonomous mode.

For example, such an operator detection sensor 160 may be deployed on tractor 115 as one of the refit/retrofitted and added proprioceptive sensors. As such, the refit control system 140 may be programmatically configured to activate the at least one of the actuators 225 from a limited subset of the actuators 225 based upon detection data generated by the operator detection sensor 160. But in another example, the refit control system 140 may be programmatically configured to prevent activation of one or more (or all) actuators 225 based upon detection data generated by the operator detection sensor 160.

In an embodiment, when a human is driving refit tractor 115, an exemplary C-TAR retrofit assembly apparatus for use on GSE may take over control of the cargo tractor 115. In such an embodiment, an exemplary form of feedback may be provided to the human to let them know something is about to happen. For example, an embodiment may have an exemplary C-TAR retrofit assembly apparatus for use on GSE include an exemplary feedback user interface coupled to the refit control system 140 (as noted above), where the feedback user interface is responsive to notification input generated by the refit control system 140 and operative to generate operator feedback information as feedback for an operator of the logistics ground support equipment. Such notification input generated by the refit control system 140 is triggered when the refit control system 140 activates the at least one of the actuators 225 according to the optimized path for the logistics ground support equipment. The operator feedback information may, for example, be an indication that the logistics ground support equipment is autonomously slowing down, be an indication that a steering wheel of steering system 144 has been autonomously locked from manual control, and/or be a visual or audible indication that a state of the logistics ground support equipment has autonomously changed via a display on the dashboard of tractor 115 and/or speaker on tractor 115 and/or status lights disposed on tractor 115. Similar feedback may be provided external to the operator's view of tractor 115 (e.g., a display and/or status lights externally focused) so that when the tractor 115 is being driven autonomously, people walking in the same environment or manually driving vehicles within the environment always know the intent of the robotic AI implemented as part of the exemplary retrofit assembly apparatus on tractor 115. As such, visual feedback on the outside of the tractor 115 may be possible, as well as audible feedback such as an automated horn beep may be activated at every stop sign and before entering or leaving a building.

Embodiments that retrofit or refit C-TAR technology described above into types of GSE may provide a variety of technological advantages and solutions to existing technical problems. For example, such benefits and solutions that are new and unconventional may include modifying existing cargo tractors to assist humans with safety and collision avoidance in an airport or regulated logistics environment; refitting cargo tractors so that they autonomously detect a human presence, respond with actuated changes to the path of the tractor, and communicate autonomous intent back to human drivers and passengers; modifying cargo tractors so that they take control over from the human to align movement in conjunction with other AI "recognized" vehicles types to ensure damage reduction and increased efficiency; and partial or full robotic AI kinetic control of a vehicle not originally intended to be semi- or fully autonomous.

Embodiments of this C-TAR technology solution could be used on GSE (e.g., cargo tractors) or any other similar vehicle type or vehicle types in similar industrial environments. Additional vehicle examples include fork lifts, golf carts, aircraft loaders, "people movers", yard mules, etc. Any vehicle type that's in a well-defined, well planned, and highly regulated environment and, as defined by industrial processes, will not be expected to leave said environment could be refit given that most autonomous rules are known and could be programmed into the AI. Any environment where it is not economically feasible to replace an existing fleet but the fleet could be refit with C-TAR embodiments using exemplary retrofit assembly apparatus that assumes at least some level of control to ensure the driver isn't hurt, doesn't hurt others, doesn't cause pre-defined damage, and limits use to only process allowed constraints (such as only being driven in certain parts of a facility). Embodiments of such a solution could be used anywhere that a vehicle needs to provide feedback to the driver that's specific to their work processes and the known intent of their actions (such as driving to a certain part of the tarmac on which an aircraft operates to retrieve a ULD container where the vehicle informs the driver that they are driving in the wrong direction, not using the shortest route, or not using an approved route). Such embodiments may be used with vehicles that need the ability to use predictive stopping and acceleration based on rules and regulations and influenced by changing external variables such weather, time of day, time of year, traffic congestion, etc. With much more sensitive controls in place, the current limitations of the vehicle due to having human drivers can be modified such as allowed speed, tow weight, number of trailing dollies, turn radius, etc.

Further embodiments may include modifications to the object detection and recognition aspects described above (e.g., as part of exemplary scene understanding module 305b) to facilitate the detection and recognition of temporary landmarks such as people, cones, and other pieces of equipment like loaders, dollies, and GSE to permanent landmarks like light and power poles, buildings, signage, barriers to virtual landmarks like road boundaries provided via geofencing. Furthermore, an embodiment may have an aircraft be refit and modified in order to communicate with one or more parts of the C-TAR embodiments using exemplary retrofit assembly apparatus (e.g., a wireless transceiver deployed as part of the refit control system 140 that allows for communications with external devise, such as servers, other refit GSE, and transceivers onboard aircraft 100).

In an embodiment, detection, recognition, and/or communication with such elements may occur in a variety of ways. For example, exemplary environment communication solutions may involve using marking or visible strips or other identifiable objects/symbols (such as magnetic tape striping) to identify key objects or situations in which one or more parts of the C-TAR embodiment should respond (or not). In more detail, an embodiment similar to that shown in FIG. 1A may place magnetically striped cones (e.g., reflective beacons 105a-105d) in key places around the aircraft at which the retrofit assembly installed on the refit cargo tractor 115 may detect, based on sensor input used to "see" the striping to either slow or fully stop based on proximity to the modified cones. Likewise, another embodiment may have parts of aircraft 100 and loaders$_{110}$ be striped or otherwise deployed with markings or identifiable symbols so that one or more parts of the C-TAR embodiment may detect, sense, and become aware of how the refit GSE should line up with the aircraft 100 for loading/unloading purposes while avoiding striking the aircraft 100. Striping, or some other marking element may be applied in different formations so that the retrofit cargo tractor 115 (or like piece of equipment) may use the retrofit assembly apparatus to know to slow and stop when around aircraft 100 but only slow and not stop around cargo dollies 120 so that the cargo tractor 115 can still be used to push the dolly 120 around for positioning purposes.

In further embodiments, additional active technical environment solutions may include electronics that use standard communicative protocols such as Bluetooth, RFID, IEEE 802.11, ZigBee, Cellular, NFC, etc. and transmit information about key components of the environment to one or more parts of the retrofit assembly apparatus onboard the refit GSE platform (e.g., the refit control system 140). In general, such an embodiment essentially provides a layer of contextual awareness to inanimate objects positioned around the facility and allows the environment to tell—in real time—the refit C-TAR-enabled equipment what to do (or not do), what to know, how to interact, and so on. This technical equipment that could be installed throughout a facility may essentially utilize the same concepts as the IoT (Internet of Things) where there is a computational component, a series of various sensors that identify information about the environment, and a communicative backbone (e.g., a transmitter, transceiver, and the like) that may be implemented in hardware alone or in a combination of hardware and software (e.g., software-defined radios as a type of communicative backbone).

Figure 8:
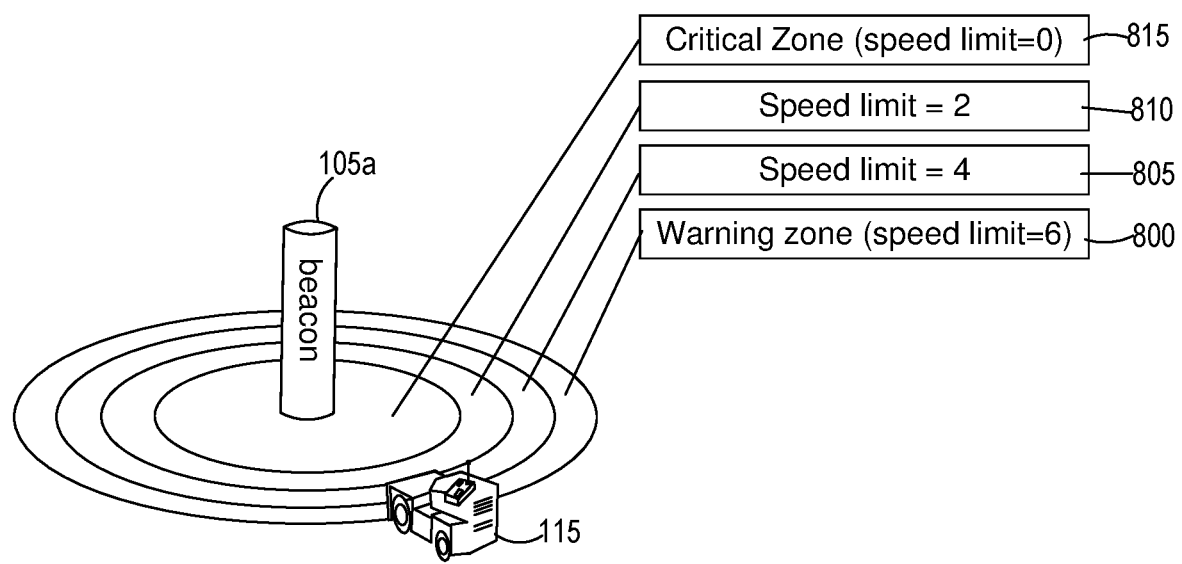
FIG. 8 is diagram illustrating the use of zones around an exemplary beacon device that may be used as a reference point type of environmental object being detected by an exemplary retrofit assembly apparatus used on logistics ground support equipment for enhanced autonomous operation in accordance with an embodiment of the invention.

Furthermore, an embodiment may create zones within an environment (such as that shown in FIGS. 1A and FIG. 8) that designate how fast a refit cargo tractor 115 or other GSE should go when a collision avoidance object is detected, such as beacon 105a shown in FIG. 8. FIG. 8 is diagram illustrating the use of zones around an exemplary beacon device 105a that may be used as a reference point type of environmental object being detected by an exemplary retrofit assembly apparatus used on logistics ground support equipment for enhanced autonomous operation in accordance with an embodiment of the invention. Referring now to FIG. 8, beacon device 105a (e.g., an IoT type of broadcasting device) may be used as a reference point for a refit GSE, such as tractor 15, using an embodiment of a C-TAR retrofit assembly apparatus described above to establish different zones (e.g., warning zone 800, speed limit zone 805, reduced speed limit zone 810, and critical zone for no entry 815) that may designate speed limits and provide further warning information to the refit GSE for use by the onboard systems when controlling and governing the speed of such a refit GSE. Such zoning information may be provided and available to the refit GSE as location or geo-fencing type of information with which to use as reference data (e.g., map and/or object information maintained in database 310*b* shown in FIGS. 3 and 4). This same zoning concept could be applied to further items/objects in the environment and controlled by virtual geofencing (such as, for example, removing any governed restrictions while the refit cargo tractor 115 is on a designated straight away or road according to map information in database 310*b* or by using virtual zones based on the placement of an object on a refit vehicle's proximity to the object (such as, for example, gradually slowing the cargo tractor as it enters various zones and gets closer to cones positioned around aircraft 100).

Embodiments may have exemplary MPC 310*c* identifying the relative location, placement, and movement of multiple trailing dollies 120 relative to refit tractor 115 and make movement decisions for the GSE as part of optimizing a path for the refit tractor 115. In general, such embodiments may have the refit control system 140 on the refit GSE programmed via MPC 310*c* so as to be unconventionally operative to calculate a polygon that identifies the placement of multiple trailing dollies and make movement decisions based on the knowledge of trailing cargo dollies (loaded or unloaded) in respect to the refit GSE's approach to an aircraft or any other piece of equipment and facility. This polygon will take into account turning radius of trailing dollies (as illustrated in FIG. 13) while the braking system keeps an awareness of the total amount of weight being pulled in order to accurately adjust for breaking and stopping.

Figure 9:
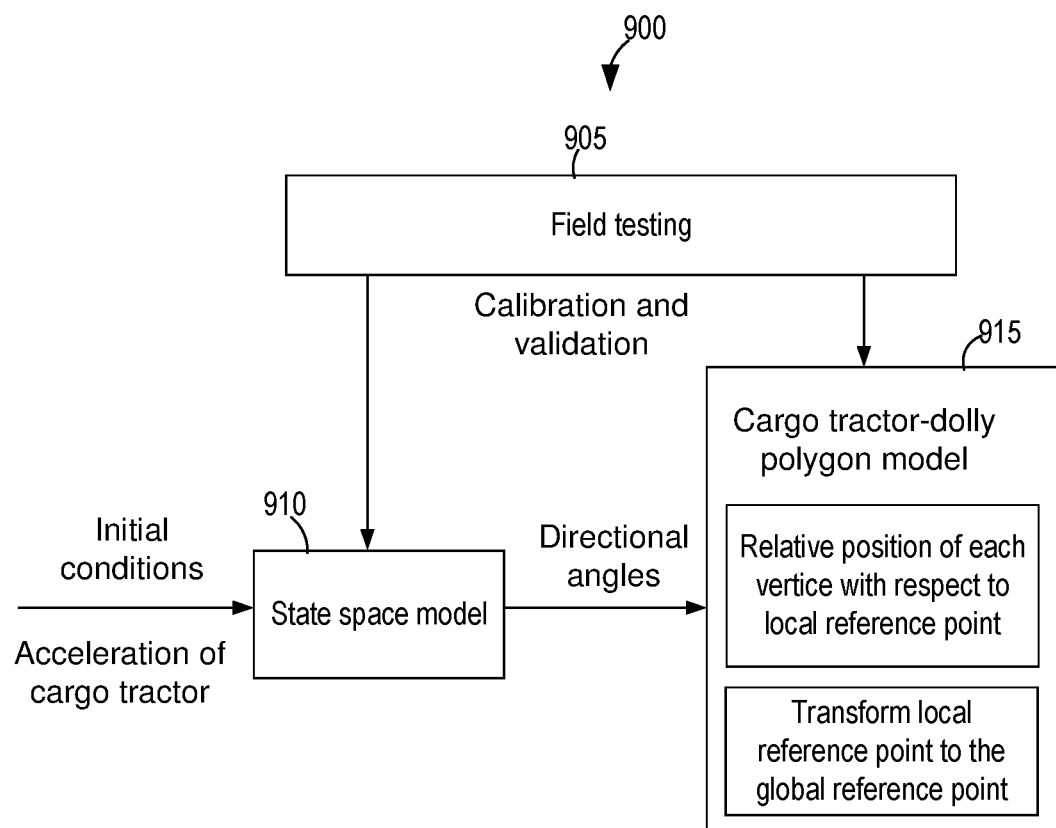
FIG. 9 is an exemplary framework diagram of a dynamic modeling framework that determines the instantaneous status of an exemplary cargo tractor-dolly system in accordance with an embodiment of the invention.
Figure 10:
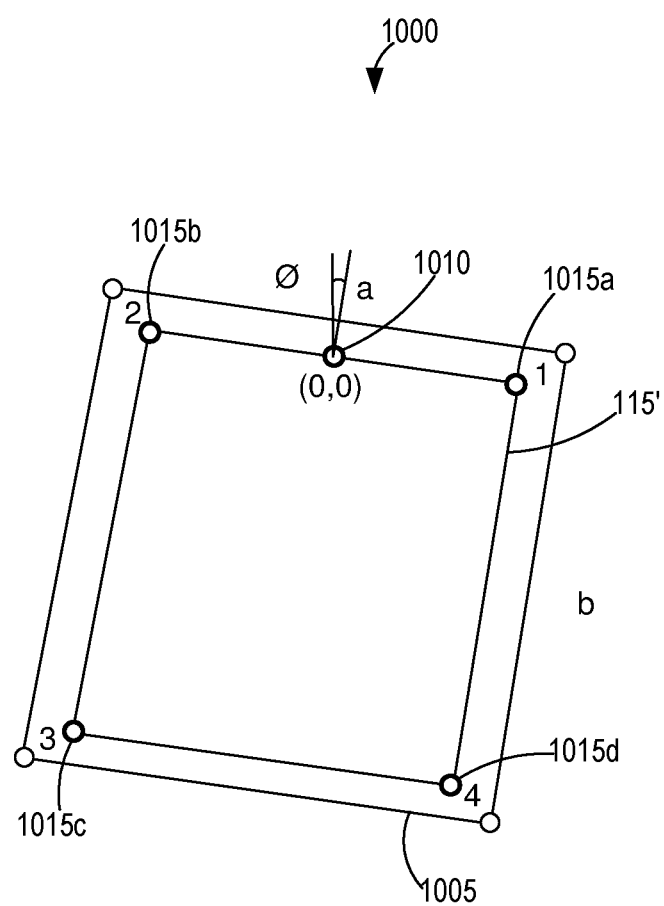
FIG. 10 is a diagram of an exemplary collision envelope for a single cargo tractor type of logistics ground support equipment model in accordance with an embodiment of the invention.
Figure 11:
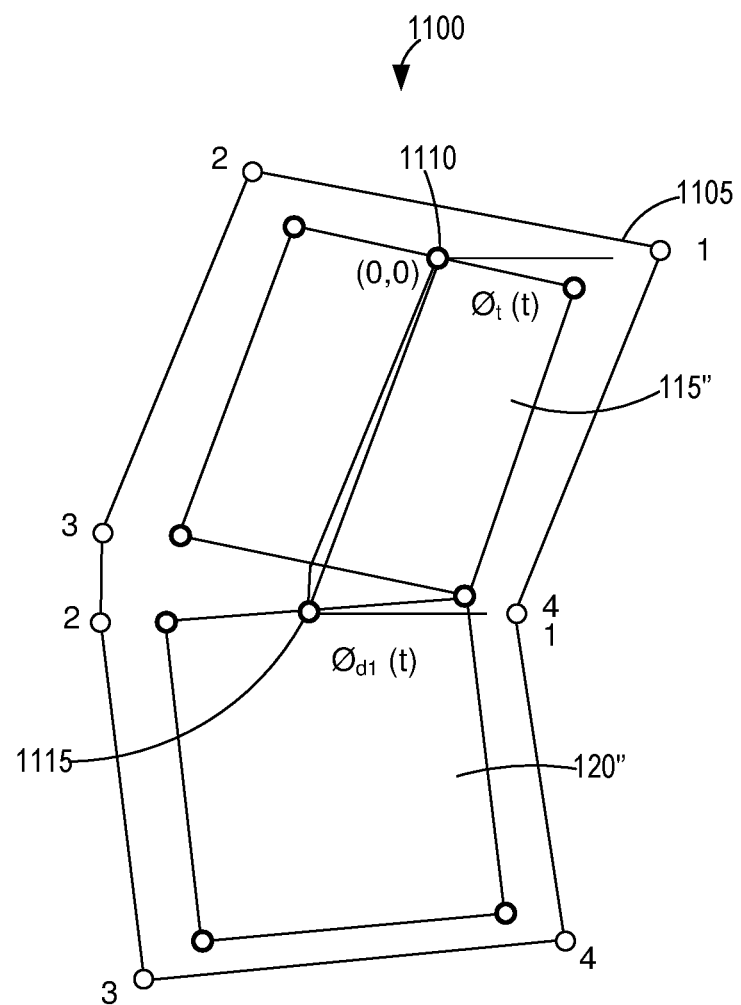
FIG. 11 is a diagram of an exemplary collision envelope for a single dolly type of ground support equipment model in accordance with an embodiment of the invention.
Figure 12:
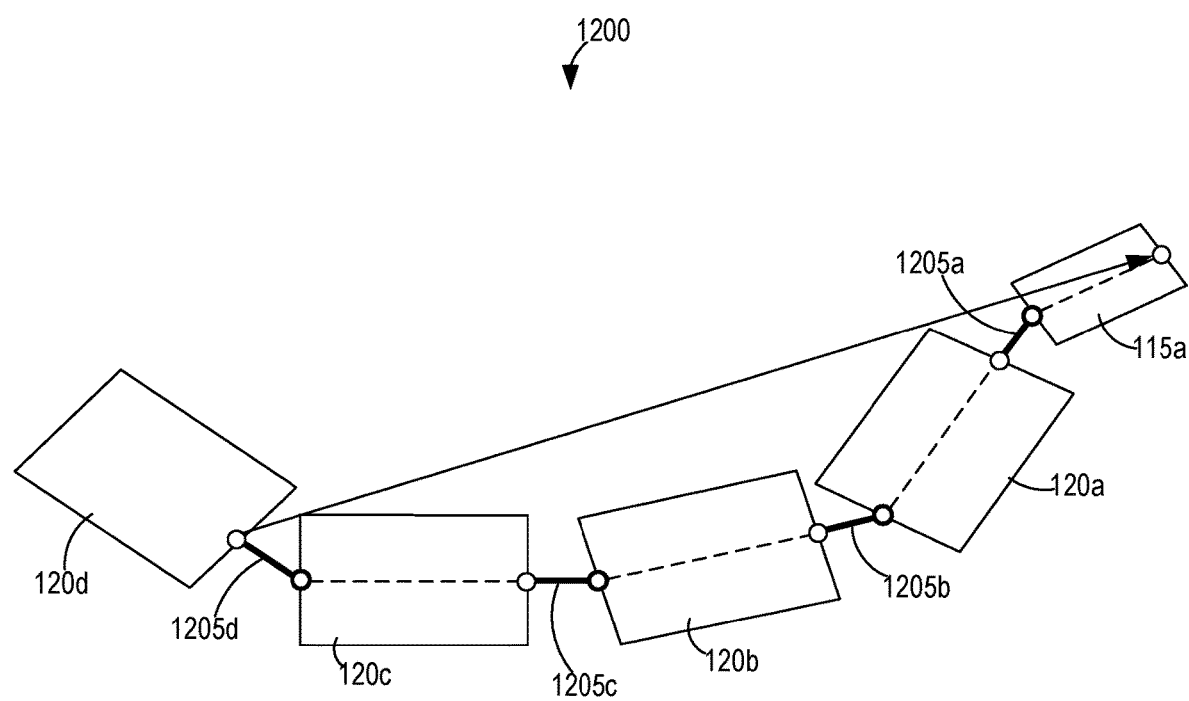
FIG. 12 is a diagram of exemplary collision awareness for a train of cargo dollies in accordance with an embodiment of the invention.

FIGS. 9-13 include further information on embodiments of the control system for a retrofit assembly apparatus used on a refit GSE that may implement exemplary MPC 310*c* with calculation logic for such a solution that allows a refit GSE (such as tractor 115) to make autonomous decisions on movement with trailing dollies. FIG. 9 is an exemplary framework diagram of an exemplary dynamic modeling framework that determines the instantaneous status of an exemplary cargo tractor-dolly system in accordance with an embodiment of the invention. As shown in FIG. 9, an exemplary dynamic modeling framework 900-915 determines the instantaneous status of towing vehicle systems by employing a state space model 910 and cargo tractor-dolly polygon model 915 to calculate instantaneous positions and velocities for the towing vehicle based, for example, on Newton's second law to estimate the positions of the subsequent towed vehicles by assuming that each towed unit follows the same path (using a sequence of directional angles provided by state space model 910 to model 915) as the towing vehicle. The state space model 910 calculates the instantaneous positions and velocities of the towing vehicle based on its initial conditions collected from IMU 156 and/or GPS 158. The position calculated using the state space model 910 represents the position of a reference point at the towing vehicle and the real-time shape of the towing vehicle will be determined based on the coordinate of that point and its dimensions. For example, as shown in FIG. 10, a single cargo tractor 115' is illustrated as a shape 1000 with vertices, an exemplary reference point 1010 located on the tractor 115', and a boundary or exemplary collision envelope 1005 encompassing tractor 115' so as to provide a buffer zone from the envelope 1005 relative to the shape of tractor 115'. The relative position of each of the vertices 1015*a*-1015*d* of the shape of tractor 115 with respect to the local reference point 1010 may be transformed to a global reference point in the operating environment of the tractor 115 by the cargo tractor-dolly polygon model 915. A similar approach may then applied to determine the instantaneous shapes of the subsequent vehicles, as reflected in shapes 1100 shown in FIG. 11 with exemplary reference point 1110 located on the tractor 115', another local reference point 1115 on dolly 120' (which is disposed at an angle relative to tractor 115'), and a boundary or exemplary collision envelope 1105 encompassing tractor 115' and dolly 120' so as to provide a buffer zone from the envelope 1105 relative to the combined shape 1100 of tractor 115' and a single dolly 120'. This may be extended for a train 1200 of cargo dollies 120*a*-120*d* shown in FIG. 12 being pulled by tractor 115*a* (with exemplary tow bars 1205*a*-1205*d* connecting the dollies to the unit in front of the respective dolly).

In light of the description above, an embodiment of an exemplary retrofit assembly apparatus for use on logistics ground support equipment (e.g., cargo tractor 115) may enhance a level of autonomous operation of the logistics ground support equipment. In this embodiment, the assembly includes a refit control system attached to the logistics ground support equipment, retrofitted sensors coupled to the refit control system, and actuators coupled to the refit control system. In particular, the refit control system (e.g., control system 140) may include a vehicle dynamics control processor (e.g., processor 310 as explained relative to FIGS. 3 and 4) and a data preprocessing control processor (e.g., processor 305 as explained relative to FIGS. 3 and 4). The retrofitted sensors coupled to the refit control system are disposed on the logistics ground support equipment as retrofitted equipment to the logistics ground support equipment. Such retrofitted sensors in this embodiment include a group of proprioceptive sensors (e.g., one or more of sensors 220) coupled to the vehicle dynamics control processor that monitor operating parameters and characteristics of the logistics ground support equipment, and a group of exteroceptive sensors (e.g., one or more of sensors 230) coupled to the data preprocessing control processor that monitor an exterior environment of the logistics ground support equipment. Each of the actuators (e.g., one or more of actuators 225) are disposed on the logistics ground support equipment as a retrofit actuator to add control of different control elements (e.g., steering 144, braking system 148, transmission 146, engine 142, throttle 154) on the logistics ground support equipment and to autonomously alter motion of the logistics ground support equipment. The refit control system (e.g., control system 140 that may be implemented with vehicle dynamics control processor 310, data preprocessing control processor 305, and their respective software modules described relative to FIGS. 3 and 4) is programmatically configured to be operative to receive first sensor data generated by the group of proprioceptive sensors using the vehicle dynamics control processor of the refit control system, and receive second sensor data generated by the group of exteroceptive sensors using the data preprocessing control processor. The programmatically configured refit control system is further operative to optimize a path for the logistics ground support equipment based upon the second sensor data from the data preprocessing control processor and the first sensor data from the vehicle dynamics control processor, and then activate (using the vehicle dynamics control processor) at least one of the actuators according to the optimized path for the logistics ground support equipment.

In a further embodiment, the programmatically configured refit control system may be further operative to eliminate discrepant data from the second sensor data using the data preprocessing control processor and generate depth and spatial awareness information relative to the current state of the logistics ground support equipment using the data preprocessing control processor. As such, the programmatically configured refit control system may then be operative to optimize the path for the logistics ground support equipment based upon the depth and spatial awareness information from the data preprocessing control processor and the first sensor data from the vehicle dynamics control processor.

In another embodiment, the vehicle dynamics control processor may be operative to activate the at least one of the actuators according to the optimized path for the logistics ground support equipment to cause one or more of the control elements on the logistics ground support equipment to alter the motion of the logistics ground support equipment (e.g., to change settings on one or more of the control elements resulting in a change in the motion of the logistics ground support equipment or to meet a vector requirement defined by a determined heading and/or altered speed associated with the optimized path).

In still another embodiment, the data preprocessing control processor may be programmatically configured to eliminate the discrepant data from the second sensor data by being further operative to transform the second sensor data to extract a set of predetermined attributes related to autonomous movement from the discrepant data. The data preprocessing control processor may also be programmatically configured to generate the depth and spatial awareness information relative to the current state of the logistics ground support equipment by being further operative to (a) receive the second sensor data over a period of time; identify a pattern from the received second sensor data (where the identified pattern is associated with at least one environmental object external to the logistics ground support equipment, and where the identified pattern associated with the environmental object is at least part of the depth and spatial awareness information); (b) identify at least a second environmental object related to a current location of the logistics ground support equipment as determined from location data in the received second sensor data (where the identified second environmental object is also at least part of the depth and spatial awareness information); and (c) identify a third environmental object from one or more exteroceptive sensor data types in the received second sensor data (where the identified third environmental object is at least part of the depth and spatial awareness information). More particularly, in this embodiment, the exteroceptive sensor data types in the second sensor data may be visual image data representing a predetermined area proximate the logistics ground support equipment, radar data representing a predetermined area proximate the logistics ground support equipment, multi-dimensional map data representing a predetermined area proximate the logistics ground support equipment, and/or proximity data representing a distance between the logistics ground support equipment and one or more of the environmental objects. Further, the environmental objects may, for example, be a lane marking, a road sign, a vehicle disposed external to the logistics ground support equipment, an aircraft, a pedestrian, a signal light, a container, and/or a facility wall.

The above-described embodiments that encompass technology solutions may be used on logistics ground support equipment, such as cargo tugs or tractors or any other similar vehicle type or vehicle types in similar industrial environments. Additional logistics ground support equipment examples include but are not limited to fork lifts, golf carts, aircraft loaders, "people movers", yard mules, and the like. Any vehicle type that's in a defined and regulated environment, as defined by industrial processes, and that will not be expected to leave such an environment may be refit with one or more of the above-described embodiments that may improve their automated, autonomous, or other operations in order to, for example, avoid collisions or create governed rules about the environment and objects within that environment. Any environment where it is not economically feasible to replace an existing fleet, may be a suitable candidate for one or more aspects of the above-described technology where the fleet could be refit with technology like that described herein assuming some level of control to ensure the driver is not hurt, does not hurt others, does not cause pre-defined damage to other equipment such as aircraft, and limits use to only process allowed constraints (such as only being driven in certain parts of a facility). For example, one or more aspects of the above-described technology solutions may be used anywhere that a logistics support vehicle provides feedback to the driver that is specific to regarding speed zones and why certain areas are speed governed. This type of solution may also be used with vehicles that need the ability to use predictive stopping and acceleration based on rules, regulations, zones, and contextual awareness.

As described above and in the related Figures, those skilled in the art will appreciate that there may be a variety of advantages or benefits of different embodiments over currently available technology. For example, one or more embodiments as described herein may provide technical solutions that address particular problems and include one or more of the following advantages or benefits:

1. Increased safety for all people in the environment
2. Reduced aircraft strikes and other costly errors caused by humans driving large and heavy industrial equipment that may prevent a final product from being delivered or cost organizations unnecessary expense
3. Increased efficiency of processes by preventing actions that could cause disruptions and ultimately waste time by making some decisions on behalf of the human driver
4. Decreased expense in marginal costs like fuel usage and employee time
5. Decreased dependency on humans to get necessary job functions completed there by mitigating the employee turnover problem currently being experienced in places like the Memphis Hub; there won't be the need to decrease employed workers but there will be an opportunity to decrease the number of job openings currently available in larger facilities
6. Increased throughput like potentially more dollies being pulled by a single cargo tractor; for example, current limitation is four dollies per tug but if the vehicle, through robotic AI and a designation of zones, is intelligent enough to control speed and braking in a way that retains existing safety parameters then a fifth dolly could be added thereby reducing trips to aircraft
7. Decreased cost in the purchase and implementation of a semi- or fully autonomous cargo tractor fleet
8. Increased understanding of where autonomy can realistically be implemented in a pre-existing airport or logistics facility using a specific and key component of the loading and off-loading part of the aircraft container movement process Adaptive Control Using Feedback Loop Monitoring Further embodiments may focus on an exemplary adaptive control system using feedback loop monitoring for improved engine performance and a method for using the same on logistics ground support equipment enhanced with such an adaptive control system. As noted above generally, there may a measurable delay between when a throttle on a GSE allows more air into the gasoline engine and when the engine power increases allowing the vehicle to move. An embodiment that deploys an exemplary adaptive control system using feedback loop monitoring aims to command a certain engine power level (e.g., a type of engine operating parameter) and may gauge one or more control feedback loop iterations in order to achieve the preferred engine performance. Those skilled in the art will appreciate that the control system feedback loop monitoring within C-TAR may vary in sensitivity across the multiple brands and their models of GSE. In general, such embodiments may help by proactively addressing latency and response time for logistics ground support equipment, such as cargo tug 115, with considerations of sensitivity to load (e.g., weight of cargo being transported by the GSE), temperature, position (e.g., on a ramp area where cargo loading/unloading may involve restricted operations), detected obstacles, location & orientation of the GSE (e.g., if the GSE is near a plane, lowering speed), building transitions, as well as weight/grade to improve operations of the equipment.

An embodiment of such an exemplary adaptive control system for improved engine performance may be deployed on logistics ground support equipment, such as tractor 115 as shown in FIG. 1B and with control, sensor, and actuator systems explained further in FIGS. 2-4. In more detail, such an embodiment of an exemplary adaptive control system may include a control system (e.g., refit control system 140 attached to tractor 115), sensors coupled to the control system (e.g., sensors 205), and at least a throttle actuator coupled to the throttle of the GSE's engine. For example, in this embodiment, refit control system 140 may be used the control system part of such an exemplary adaptive control system and may be implemented with vehicle dynamics control processor 310 and data preprocessing control processor 305. The sensors coupled to the control system are disposed on the tractor 115, and include a proprioceptive sensor (e.g., exemplary engine RPM sensor 180, transmission status sensor 166, or an airflow sensor (not shown)) coupled to the vehicle dynamics control processor 301 that monitors an engine operating parameter (e.g., engine power generated) of the engine 142 of tractor 115. In this embodiment, the sensors coupled to the control system also include a second group of exteroceptive sensors (e.g., sensors 230) coupled to the data preprocessing control processor 305 (as shown in FIG. 3) that monitor an exterior environment of the tractor 115. In this example embodiment, the throttle actuator may be implemented with exemplary throttle actuator 174 coupled to the vehicle dynamics control processor 310 of the control system (e.g., via vehicle motion control software module 310d running on processor 310) and disposed on the tractor 115 to be in responsive communication with the throttle control 154 for engine 142.

In this embodiment, refit control system 140 as described above is programmatically configured to be operative as part of the exemplary adaptive control system for improved engine performance to (a) receive sensor data (first sensor data) generated by the proprioceptive sensor using the vehicle dynamics control processor 310 where this first sensor data indicators a current state of the engine operating parameter; (b) receive additional sensor data (second sensor data) generated by the group of exteroceptive sensors using the data preprocessing control processor 305, where this second sensor data indicates a current state of the exterior environment of the tractor 115; (c) determine, by the vehicle dynamics control processor 310, a predicted state of the exterior environment based upon the second sensor data; (d) proactively adjust the throttle control 154 for the engine with an adjustment signal supplied by the vehicle dynamics control processor 310 to the throttle actuator 174 (where the level of the adjustment signal is based upon the first sensor data and the second sensor data); and (e) repeat functions (a)-(d) in an adaptive feedback loop to address latency in performance of the engine 142 of the refit tractor 115.

In more detail embodiments, the predicted state of the exterior environment of tractor 115 may be implemented using particular exteroceptive sensor-based information as generated by the data processing control processor 305 and provided to the vehicle dynamics control processor 310 (e.g., exemplary MPC 310c as executing on vehicle dynamics control processor 310). For example, the predicted state of the exterior environment of tractor 115 may be determined by the vehicle dynamics control processor 310 based upon spatial awareness information provided to the vehicle dynamics control processor 310 by spatial awareness module 305c running on data preprocessing control processor 305. Such spatial awareness information may be generated by the data processing control processor 305 via spatial awareness module 305c using the second sensor data received by the data preprocessing control processor 305 (e.g., location data from GPS 158 and/or IMU 156 representing a current position of the tractor 115 as at least part of the sensor data received by the data preprocessing control processor 305. In even more detail, the predicted state of the exterior environment of tractor 115 may be determined by the vehicle dynamics control processor 310 based upon (i) spatial awareness information provided to MPC 310c running on vehicle dynamics control processor 310 by spatial awareness module 305c running on data preprocessing control processor 305, and (ii) contextual environmental data from database 310b (e.g., map data and/or object data) accessed by the vehicle dynamics control processor 310 (where the contextual environmental data identifies a known location of an environmental object, such as an aircraft, building, other GSE, and the like).

In still another example, the predicted state of the exterior environment of tractor 115 may be determined by the vehicle dynamics control processor 310 based upon depth information provided to the vehicle dynamics control processor 310 by the data preprocessing control processor 305, where the depth information is generated by the data processing control processor using the second sensor data received by the data preprocessing control processor 305 (e.g., where such depth information is object detection and distance estimation information representing one or more detected environmental objects in the exterior environment of the tractor 115, and where such object detection and distance estimation information is generated by scene understanding module 305b running on the data processing control processor 305 and is based upon at least part of the second sensor data received by the data preprocessing control processor, such as image data from camera sensor 188, or radar data from radar sensor 190, multi-dimensional map data from LiDAR sensor 186, and/or proximity data from an ultrasonic sensor 420. As explained above, exemplary depth information (e.g., object detection, object classification, and distance estimation information) and spatial awareness information may be generated by the data processing control processor 305 using exteroceptive sensor data received by the data preprocessing control processor 305 and where such depth and spatial information is related to an environmental object in the exterior environment of the tractor 115 (e.g., aircraft 100, a restricted ramp area for aircraft operations, a change in roadway grade, a building, a transition between buildings, and the like).

In a further example, the predicted state of the exterior environment of tractor 115 may be determined by the vehicle dynamics control processor 310 based upon orientation information provided to the vehicle dynamics control processor 310 by the data preprocessing control processor 305. In this example, such orientation information may supplement location information on the tractor 115, and may be generated by the data processing control processor 305 using the exteroceptive sensor data received by the data preprocessing control processor 305 (location data, visual image data, radar data, LiDAR data, and the like) that helps identify a relative orientation of tractor 115 to environmental objects detected in the exterior environment of the tractor 115 (e.g., orientation to an aircraft, loader 110, beacon, ramp area, and the like).

In a further embodiment of the adaptive control system for improved engine performance on logistics ground support equipment, the system may further include second proprioceptive sensor coupled to the vehicle dynamics control processor that monitors a weight of cargo transported by the logistics ground support equipment (e.g., weight sensor 196). As such and in this further embodiment, the control system (e.g., refit control system 140) may be further programmatically configured to be operative to (f) receive third sensor data generated by this weight sensor using the vehicle dynamics control processor 310 (where the third sensor data indicating the weight of the cargo transported by the logistics ground support equipment). With this additional third sensor data (i.e., sensor data indicative of weight or load associated with the tractor 115), the control system may be programmatically configured to be operative to perform (d) by being further operative to proactively adjust the throttle control 154 for the engine 142 with the adjustment signal supplied by the vehicle dynamics control processor 310 to the throttle actuator 174, where the level of the adjustment signal in this embodiment is based upon the first sensor data and the second sensor data and the third sensor data. As such, the control system may also be programmatically configured to be operative to perform (e) by being further operative to repeat functions (a)-(d) and (f) in a modified version of the adaptive feedback loop to address latency in performance of the engine of the logistics ground support equipment.

As noted above, throttles on carbureted engines may be more sensitive to temperature and other environmental conditions when compared to non-carbureted engines. In a further embodiment of the adaptive control system for improved engine performance on a logistics ground support equipment, such a system may further include another temperature sensor type of proprioceptive sensor (e.g., exemplary temperature sensor 194) coupled to the vehicle dynamics control processor 310 (e.g., the vehicle motion control module 310d running on vehicle dynamics control processor 310) that monitors a temperature related to tractor 115. In this further embodiment, the control system 140 may be further programmatically configured to be operative to (f) receive third sensor data generated by such a temperature sensor using the vehicle dynamics control processor 310. In this further embodiment, function (d) may be modified so that control system 140 is programmatically configured to be operative to perform (d) by proactively adjusting the throttle control 154 for the engine 142 with the adjustment signal supplied by the vehicle dynamics control processor 310 to the throttle actuator 174, where the level of the adjustment signal in this embodiment may be based upon the first sensor data (engine operating parameter data) and the second sensor data (sensor data from exteroceptive sensors) and the third sensor data (temperature-related sensor data). As such, control system 140 may be programmatically configured to be operative to perform (e) by being further operative to repeat functions (a)-(d) and (f) in a modified version of the adaptive feedback loop to address latency in performance of the engine of the logistics ground support equipment. An embodiment may be further programmatically configured for the control system 140 to perform (e) within a predetermined time period to address latency in performance of the GSE engine, where parameters on such a predetermined time period varying according to different models of GSE and their respective engines.

Figure 14:
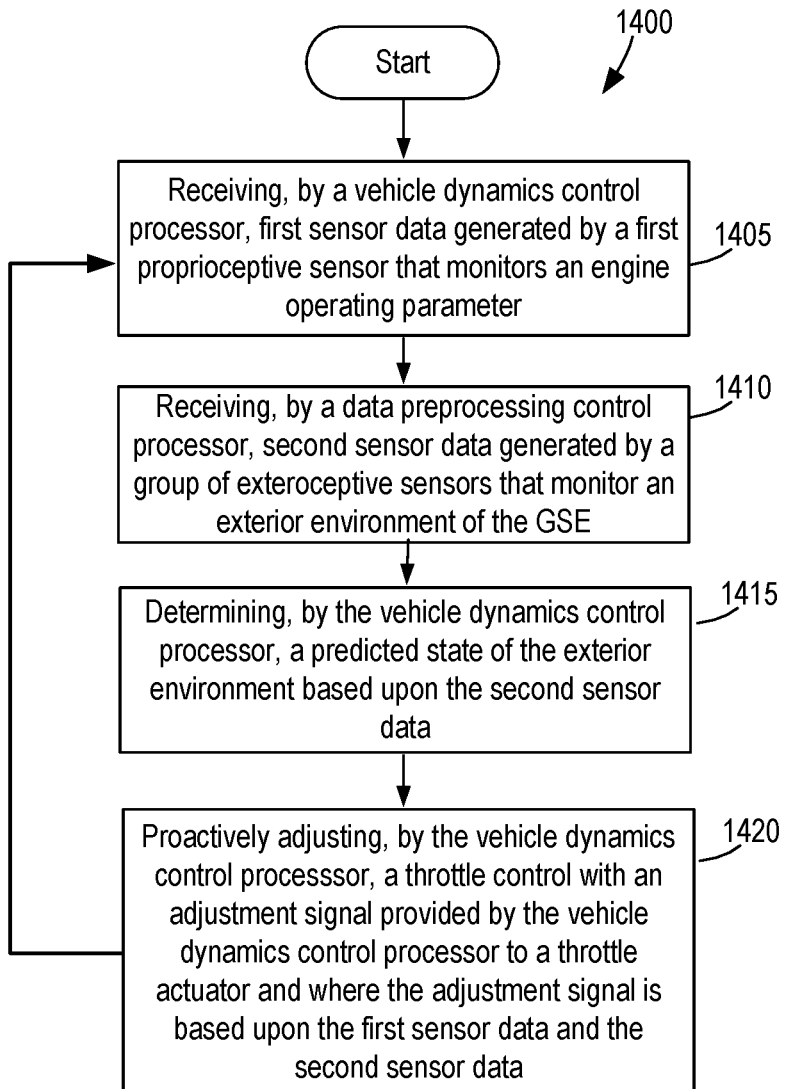
FIG. 14 is a flow diagram of an exemplary method for improved engine performance using an adaptive control system on a logistics ground support equipment in accordance with an embodiment of the invention.

The above-described embodiments for an adaptive control system may be further described in terms of a method of operation of such an adaptive control system that improves engine performance of logistics ground support equipment. FIG. 14 is a flow diagram of an exemplary method for improved engine performance using an adaptive control system on logistics ground support equipment in accordance with an embodiment of the invention. Referring now to FIG. 14, exemplary method 1400 begins at step 1405 with a vehicle dynamics control processor (e.g., vehicle dynamics control processor 310) receiving first sensor data generated by a first proprioceptive sensor that monitors an engine operating parameter of the engine, where the first sensor data indicates a current state of the engine operating parameter. For example, such an engine operating parameter may be a power generated by engine 142 as monitored by an air flow sensor disposed within engine 142 as the first proprioceptive sensor. In another example, the engine operating parameter may be a power generated by engine 142 as monitored by exemplary engine RPM sensor 180 or an exemplary transmission status sensor 166 as the first proprioceptive sensor.

At step 1410, method 1400 continues with a data preprocessing control processor (e.g., data preprocessing control processor 305) receiving second sensor data generated by group of exteroceptive sensors that monitor an exterior environment of the logistics ground support equipment. The second sensor data indicates a current state of the exterior environment of the logistics ground support equipment. For example, data preprocessing control processor 305 may receive sensor data from one or more of LiDAR 186, one or more camera sensors 188, radar sensor 190, IMU 156, and GPS 158. In this example, data preprocessing control processor 305 receives sensor data about the exterior environment of refit tractor 115—e.g., visual, radar, and mapping images of what is near tractor 115 and from which objects may be detected, classified, and ranges (via processing modules 305a, 305b) and location information on the tractor 115.

At step 1415, method 1400 proceeds with the vehicle dynamics control processor determining a predicted state of the exterior environment based upon the second sensor data. For example, exemplary vehicle dynamics control process 310 may use model predictive control module 310c (or MPC) to determine the predicted state of the exterior environment of refit tractor 115 in the near future using predictive look-ahead steps as explained above.

In more detail, a more specific embodiment of step 1415 may have the vehicle dynamics control processor determining the predicted state of the exterior environment by the vehicle dynamics control processor based upon spatial awareness information provided to the vehicle dynamics control processor by the data preprocessing control processor. Such spatial awareness information in this embodiment of step 1415 may be generated by the data processing control processor using the second sensor data received by the data preprocessing control processor. For example, vehicle dynamics control processor 310 may determine the predicted state of the exterior environment of refit tractor 115 by the vehicle dynamics control processor 310 running MPC 310c based upon spatial awareness information provided by spatial awareness module 305c running on data preprocessing control processor 305 to the vehicle dynamics control processor 310. Such spatial awareness information may be based upon location data representing a current position of the refit tractor 115 (e.g., location data generated by exemplary GPS sensor 158 or IMU 156 disposed on the refit tractor 115 as at least part of the group of exteroceptive sensors).

In another embodiment of step 1415, the vehicle dynamics control processor may determine the predicted state of the exterior environment based upon (i) spatial awareness information provided to the vehicle dynamics control processor by the data preprocessing control processor (where the spatial information is generated by the data processing control processor using the second sensor data received by the data preprocessing control processor); and (ii) contextual environmental data accessed by the vehicle dynamics control processor (wherein the contextual environmental data identifies a known location of an environmental object). Such contextual environmental data may, for example, include map and/or object data in database 310b accessible by MPC 310c running on vehicle dynamics control processor 310 as explained relative to FIGS. 3 and 4.

In still another embodiment of step 1415, the vehicle dynamics control processor may determine the predicted state of the exterior environment based upon depth information provided to the vehicle dynamics control processor by the data preprocessing control processor, where such depth information is generated by the data processing control processor using the second sensor data received by the data preprocessing control processor. For example, vehicle dynamics control processor 310 may determine the predicted state of the exterior environment of refit tractor 115 by the vehicle dynamics control processor 310 running MPC 310c based upon depth information provided by scene understanding module 305b running on data preprocessing control processor 305 to the vehicle dynamics control processor 310. In more detail, exemplary depth information may be object detection and distance estimation information representing one or more detected environmental objects in the exterior environment of the logistics ground support equipment, where such object detection and distance estimation information is generated by the data processing control processor 305 running scene understanding module 305b and is based upon at least part of the second sensor data received by the data preprocessing control processor (e.g., image data from camera sensor 188 disposed on refit tractor 115, radar data from radar sensor 190 disposed on refit tractor, and/or proximity data from ultrasonic sensor 420 (or some other proximity sensor) disposed on refit tractor 115).

In yet another embodiment of step 1415, the vehicle dynamics control processor may determine the predicted state of the exterior environment based upon depth and spatial awareness information provided to the vehicle dynamics control processor by the data preprocessing control processor, where the depth and spatial awareness information is generated by the data processing control processor using the second sensor data received by the data preprocessing control processor, and where the depth and spatial information is related to an environmental object in the exterior environment of the logistics ground support equipment. Such an environmental object may be, for example, an aircraft, a restricted ramp area for aircraft operations, a change in roadway grade, a building, or a transition between a first building and a second building.

In still another embodiment of step 1415, the vehicle dynamics control processor may determine the predicted state of the exterior environment based upon orientation information provided to the vehicle dynamics control processor by the data preprocessing control processor. Such orientation information may be generated by the data processing control processor using the second sensor data received by the data preprocessing control processor, and where the orientation information is relative to an environmental object detected in the exterior environment of the logistics ground support equipment. For example, orientation information generated by data preprocessing control processor 305 may be a type of spatial awareness information that indicates a relative orientation of refit tractor 115 to an environmental object detected near the refit tractor 115 (e.g., a nearby loader 110 or aircraft 100).

At step 1420, method 1400 proceeds with the vehicle dynamics control processor proactively adjusting a throttle control for the engine (e.g., throttle 154 for engine 142 on refit tractor 115) with an adjustment signal supplied by the vehicle dynamics control processor to a throttle actuator (e.g., throttle actuator 174), where the level of the adjustment signal is based upon the first sensor data and the second sensor data. Thereafter, step 1420 of method 1400 moves back to step 1405 so as to repeat steps 1405 through 1420 in an adaptive feedback loop to address latency in performance of the engine of the logistics ground support equipment. In some embodiments, repetition of steps 1405-1420 may be accomplished within a predetermined time period to address the particular latency in performance of a particular engine used in the logistics ground support equipment.

In a further embodiment, method 1400 may also include a step with the vehicle dynamics control processor receiving third sensor data generated by a second proprioceptive sensor coupled to the vehicle dynamics control processor that monitors a weight of cargo transported by the logistics ground support equipment, where the third sensor data indicates or is at least related to the weight of the cargo transported by the logistics ground support equipment. As such, step 1420 may be implemented with the vehicle dynamics control processor proactively adjusting the throttle control for the engine with the adjustment signal where the level of the adjustment signal is now based upon the first sensor data and the second sensor data and the third sensor data. Additionally in this further embodiment, step 1420 of method 1400 moves back to step 1405 so as to repeat steps 1405, 1410, 1415, modified step 1420 as well as the step of receiving the third sensor data in an adaptive feedback loop to address latency in performance of the engine of the logistics ground support equipment.

In another further embodiment, method 1400 may also include a step with the vehicle dynamics control processor receiving third sensor data generated by a second proprioceptive sensor coupled to the vehicle dynamics control processor that monitors a temperature related to the logistics ground support equipment, where the third sensor data indicates the temperature of the logistics ground support equipment (e.g., an ambient temperature on or near the refit tractor 115). As such, step 1420 may be implemented with the vehicle dynamics control processor proactively adjusting the throttle control for the engine with the adjustment signal where the level of the adjustment signal is now based upon the first sensor data and the second sensor data and the third sensor data. Additionally in this further embodiment, step 1420 of method 1400 moves back to step 1405 so as to repeat steps 1405, 1410, 1415, modified step 1420 as well as the step of receiving the third sensor data in an adaptive feedback loop to address latency in performance of the engine of the logistics ground support equipment.

Those skilled in the art will appreciate that this adaptive control method for improving engine performance on a logistics ground support equipment as disclosed and explained above in various embodiments may be implemented on refit control system 140 and with particular exteroceptive sensors 230, particular proprioceptive sensors 220, and a throttle actuator 174 illustrated in FIGS. 1B-4, running program code disposed to be executed by respective processors used in control system 140. Such code may be stored on a non-transitory computer-readable medium such as memory storage coupled with each of such processors. Thus, when executing such code, the control system may be operative to perform operations or steps from the exemplary methods disclosed above, including this method and variations of that method.

Enhanced Contextual Environment Data for Spatial Awareness

Still further embodiments may have methods and systems deploying enhanced data preprocessing and spatial awareness techniques by an exemplary refit control system via the use of the known contextual environment for particular logistics ground support equipment (such as a cargo tug). Such a contextual environment may, for example, include information on known environments (e.g., buildings, airport layout, plane footprint, and the like) as well as a temporally detected environment of an airport and loading areas (e.g., temporary barriers/temporary objects vs base layout). Further aspects of the contextual environment may include a time component added to static/known layout issue (e.g., day v. night; seasonal issues; personnel detected) when navigating the logistics areas, such as an airport and/or particular loading and unloading areas.

Local optimization is the component of path optimization that finds the path with the minimum time. Sometimes this can be based on complete knowledge of the surrounding layout of the environment (e.g., contextual data used by the onboard controller) or based on a "guess" where past history (e.g., another type of contextual data based on historical information) or unfamiliar conditions may dictate a more preferred movement based on ether human or robotic conservation (e.g., prompted contextual data).

As noted above, embodiments may include electronics that use standard communicative protocols such as Bluetooth, RFID, IEEE 802.11, ZigBee, Cellular, NFC, etc. and transmit information about key components of the environment to one or more parts of the retrofit assembly apparatus onboard the refit GSE platform (e.g., the refit control system 140). In general, such an embodiment essentially provides a layer of contextual awareness to inanimate objects positioned around the facility and allows the environment to tell—in real time—the refit C-TAR-enabled equipment what to do (or not do), what to know, how to interact, and so on. This technical equipment that could be installed throughout a facility may essentially utilize the same concepts as the IoT (Internet of Things) where there is a computational component, a series of various sensors that identify information about the environment, and a communicative backbone (e.g., a transmitter, transceiver, and the like) that may be implemented in hardware alone or in a combination of hardware and software (e.g., software-defined radios as a type of communicative backbone).

For example, such an embodiment may take the form of a retrofit assembly apparatus for use on a logistics ground support equipment (e.g., a refit tractor 115) to enhance a level of autonomous operation of the logistics ground support equipment. Such an assembly apparatus may include, for example, a refit control system (e.g., control system 140) attached to the refit tractor 115, retrofitted sensors (e.g., sensors 220, 230) coupled to the refit control system and disposed on the refit tractor 115 as retrofitted equipment to the tractor 115, and actuators (e.g., actuators 225) coupled to the refit control system. In more detail, the refit control system in this apparatus embodiment involving the use of such contextual environment data includes a vehicle dynamics control processor (e.g., exemplary vehicle dynamics control processor 310), a data preprocessing control processor (e.g., exemplary data preprocessing control processor 305) in communication with the vehicle dynamics control processor, and a database (e.g., exemplary database 310b) operatively coupled to the vehicle dynamics control processor, where the database maintains contextual environment data (e.g., map data, object data, and the like) related to an operating environment for the logistics ground support equipment. In this apparatus embodiment, the retrofitted sensors include a first group of proprioceptive sensors (e.g., exemplary sensors 220) coupled to the vehicle dynamics control processor 310 that monitor operating parameters and characteristics of the refit tractor 115, and a second group of exteroceptive sensors (e.g., exemplary sensors 230) coupled to the data preprocessing control processor 305 that monitor an exterior environment of the refit tractor 115. Each of the actuators (e.g., exemplary actuators 225) is disposed on refit tractor 115 as a retrofit actuator to add control of different control elements on the refit tractor 115 (such as the throttle 154, transmission 146, brake system 148, steering system 144, and the like) and to autonomously alter motion of the refit tractor 115. In this particular apparatus embodiment involving the use of such contextual environment data, the refit control system 140 is programmatically configured to be operative to receive first sensor data generated by the first group of proprioceptive sensors using the vehicle dynamics control processor and receive second sensor data generated by the second group of exteroceptive sensors using the data preprocessing control processor. The data preprocessing control processor 305 of the refit control system 140 is programmatically configured to be operative to generate depth and spatial awareness information relative to the current state of the refit tractor 115 based upon the second sensor data. The refit control system 140 is further programmatically configured to access the contextual environment data from the database using the vehicle dynamics control processor 310 (via MPC 310c) based upon the depth and spatial awareness information provided by the data preprocessing control processor 305 to the vehicle dynamics control processor 310. The vehicle dynamics control processor 310 of the refit control system 140 is programmatically configured to be further operative to (a) determine a heading and speed for the refit tractor 115 (e.g., an example of an optimized path) based upon the depth and spatial awareness information as provided by the data preprocessing control processor 305 to the vehicle dynamics control processor 310, the contextual environmental data accessed by the vehicle dynamics control processor 310, and the first sensor data received by the vehicle dynamics control processor 310; and (b) activate at least one of the actuators according to the determined heading and speed for the refit tractor 115.

In a further embodiment of this particular apparatus involving the enhanced use of contextual environment data, exemplary contextual environment data (as accessed and used by the refit control system 140) may be implemented as a type of contextual environment data representative of static known features of relevant environmental objects related to the operating environment of the refit tractor 115. In more detail, exemplary contextual environment data may be information related to at least one known environment object existing in a current proximate operating environment of the logistics ground support equipment. For example, such contextual environment data may be information related to a building located within the current proximate operating environment of the logistics ground support equipment, information related to an aircraft serviced by refit cargo tractor 115 and/or located within the current proximate operating environment of the refit tractor 115 (e.g., information on the type of aircraft, a layout status, a physical footprint of the aircraft, a loading status of the aircraft, a desired load for the aircraft, and the like). In another example, such contextual environment data may be implemented as information related to a geofenced boundary restriction for refit tractor 115 (e.g., location coordinates defining a boundary for operations of the refit tractor 115 or location-based zones of operation for refit tractor 115 with particular limits on operations, such as zones 800-815).

In another embodiment of this particular apparatus involving the enhanced use of contextual environment data, exemplary contextual environment data (as accessed and used by the refit control system 140) may be implemented as a type of contextual environment data representative of temporally detected features of relevant environmental objects related to the operating environment of the refit tractor 115. In more detail, exemplary contextual environment data may be related to at least one environment object temporarily existing in a current proximate operating environment of the refit tractor 115, such as depth and spatial awareness information. Such an object may, for example, be a temporary barrier existing in the current proximate operating environment of the refit tractor 115.

In still another embodiment of this particular apparatus involving the enhanced use of contextual environment data, exemplary contextual environment data (as accessed and used by the refit control system 140) may be implemented as a type of contextual environment data about a known environmental object in the operating environment of the refit tractor 115 with particular temporal use characteristics. In more detail, exemplary contextual environment data may be information related to at least one known environment object disposed in a current proximate operating environment of the refit tractor 115 according to a known temporal use. For example, such an exemplary known temporal use may be a use specified during a predetermined time-based schedule (e.g., a predetermined time of day, predetermined days of a week, a predetermined seasonal time period, and the like).

In an additional embodiment of this particular apparatus involving the enhanced use of contextual environment data, exemplary contextual environment data (as accessed and used by the refit control system 140) may be implemented as a type of contextual environment data based upon a past history related to the current operating environment for refit tractor 115. In more detail, exemplary contextual environment data may be information related to historical information on the current proximate operating environment of the refit tractor 115, such as historic usage information about the current proximate operating environment of refit tractor 115, historic usage information on loading cargo in the current proximate operating environment of refit tractor 115, and/or historic usage information on unloading cargo in the current proximate operating environment of the logistics ground support equipment.

Embodiments using enhanced environmental awareness through contextual environment data may provide path optimization solutions (e.g., determined headings and altered speed for a refit logistics ground support equipment) that may leverage retrofitted hardware and sensors as an assembly apparatus or package deployed on other existing fleet machines and ground support equipment. Such embodiments provide a further solution that may further leverage environmental awareness through contextual environment data (similar to that explained above) provided to the enhanced/retrofitted ground support equipment, where the environmental awareness takes the form of contextual data on temporary objects/landmarks, permanent or fixed objects/landmarks, and geofencing type of boundary information as well as information on aircraft being loaded or unloaded (e.g., type of aircraft, changes to the aircraft, the current loaded layout or status for the aircraft, what may be desired to be loaded onto the aircraft). In such a further embodiment, the refit control system 140 may be programmatically configured to be further operative to receive the contextual environment data related to the operating environment for the logistics ground support equipment (e.g., refit tractor 115) from an external transceiver, such as a transceiver implemented as part of a refit control system deployed on another logistics ground support equipment or a central server as shown in more detail in FIG. 15. In more detail, the external transceiver may be a sensor-based transceiver disposed on another logistics ground support equipment (e.g., the transceiver-based refit control system having sensors similar to that shown in FIG. 3) where the contextual environment data received from such a sensor-based transceiver on the other logistics ground support equipment may be information detected about an environment object (e.g., aircraft 1515) existing in a local proximate operating environment of that other logistics ground support equipment. In an embodiment where the external transceiver is implemented as a server, such a server may be a central server (e.g., server 1505 shown in FIG. 15) in communication with a fleet of ground support equipment (e.g., GSEs 1501a-1505c) in the operative environment for the logistics ground support equipment (e.g., GSE 1505b, which may be considered the refit tractor 115 in an example). In this example using an exemplary central server as the external transceiver, the contextual environment data may be received from the central server (e.g., server 1505) by GSE 1505b operating as refit tractor 115) where the contextual environment data is information detected about an environment object existing in a local proximate operating environment of another logistics ground support equipment (e.g., GSE 1505c) from the fleet of ground support equipment. Such central server provided contextual environment data may, for example, be information including temporal spatial awareness information managed by the central server and collected by the central server from other logistics ground support equipment in the fleet of ground support equipment.

In more detail, additional embodiments may deploy a hive type of management for a fleet of logistics ground support equipment (such as a fleet of cargo tugs). This may involve the creation of temporal spatial awareness data on a central server (based upon information provided to the server from members of the fleet) that may be proactively distributed to other autonomous vehicles (e.g., refit logistics ground support equipment) in the fleet so that different ones of the autonomous vehicles in the fleet may be aware of operations of other members of the fleet and as a way of avoiding fleet member collisions in addition to the advantage of making use of enhanced contextual environment data originally generated by other members of the fleet.

Figure 15:
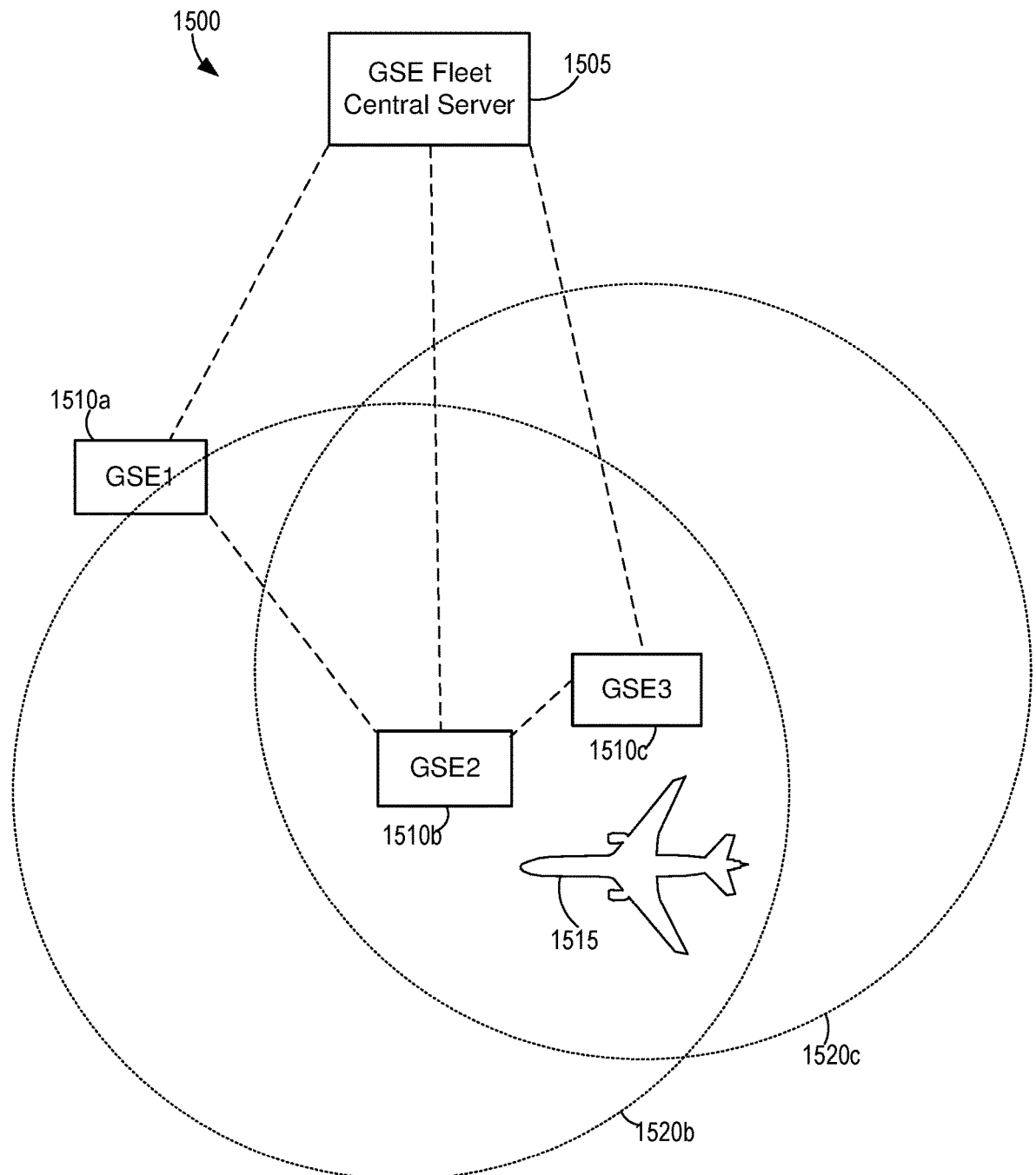
FIG. 15 is a diagram of an exemplary fleet of logistics ground support equipment involving an exemplary central server that may manage, collect, and distribute relevant contextual environment data to and from logistics ground support equipment in the fleet in accordance with an embodiment of the invention.

FIG. 15 is a diagram of an exemplary fleet of logistics ground support equipment involving an exemplary central server that may manage, collect, and distribute relevant contextual environment data to and from logistics ground support equipment in the fleet in accordance with an embodiment of the invention. Referring now to FIG. 15, an exemplary system 1500 is illustrated that includes exemplary fleet of logistics ground support equipment 1510*a*-1510*c* (also referred to as GSE1-GSE3, respectively) and a central server 1505 (also referred to as GSE fleet central server 1505). Each of logistics ground support equipment 1510*a*-1510*c* have been retrofitted with a refit assembly apparatus as described above similar to that shown in FIGS. 1B-4 and similar to that described above relative to refit tractor 115. In such a fleet-based system embodiment, those skilled in the art will appreciate that each of logistics ground support equipment 1510*a*-1510*c* have their respective locally proximate operating environment—e.g., exemplary operating environment 1520*b* shown for GSE2 1510*b* and exemplary operating environment 1520*c* shown for GSE3 1510*c*. Each of logistics ground support equipment 1510*a*-1510*c* may collect sensor based data (e.g., data from the respective exteroceptive sensors 230 and exemplary proprioceptive sensors 220) and share such sensor-based data (which may also be used to update contextual environment data on the respective locally proximate operating environment of that particular logistics ground support equipment) with central server 1505 for centralized management and sharing of such data with other logistics ground support equipment in the fleet. Such data may further be directly shared by the logistics ground support equipment 1510*a*-1510*c* originally generating such data with others of the fleet directly (e.g., from GSE2 1510*b* to GSE3 1510*c*). In this way, temporal spatial awareness data from one of the refit equipment 1510*b* may be proactively distributed to other autonomous vehicles (e.g., other refit logistics ground support equipment 1510*a*, 1510*c*) in the fleet directly or via uploading and further distribution by central server 1505.

As shown in FIG. 15, an embodiment may be implemented of an exemplary system to enhance a level of autonomous operation of logistics ground support equipment operating as a fleet of ground support equipment. In this embodiment, the exemplary system may include an external management transceiver (e.g., central server 1505) in communication with a first of the logistics ground support equipment (e.g., refit GSE2 1510*b*) and a second of the logistics ground support equipment (e.g., refit GSE3 1510*c*). The exemplary system further includes a refit control system 140 attached to the first logistics ground support equipment (e.g., refit GSE2 1510*b* similar to that described above for refit tractor 115). Such a refit control system in this embodiment includes a vehicle dynamics control processor (e.g., exemplary vehicle dynamics control processor 310), a data preprocessing control processor (e.g., exemplary data preprocessing control processor 305) in communication with the vehicle dynamics control processor, and a database (e.g., exemplary database 310*b*) operatively coupled to the vehicle dynamics control processor. The exemplary system further includes retrofitted sensors (e.g., exemplary sensors 205) and actuators (e.g., exemplary actuators 225) coupled to the refit control system. Such retrofitted sensors in this system embodiment are disposed on refit GSE2 1510*b* as retrofitted equipment to refit GSE2 1510*b* and include a first group of proprioceptive sensors coupled to the vehicle dynamics control processor on refit GSE2 1510*b* that monitor operating parameters and characteristics of refit GSE2 1510*b*, and a second group of exteroceptive sensors coupled to the data preprocessing control processor on refit GSE2 1510*b* that monitor an exterior environment of refit GSE2 1510*b*. The actuators coupled to the refit control system on refit GSE2 1510*b* and disposed on refit GSE2 1510*b* add control of different ones of control elements (e.g., steering, throttle, transmission, brakes) on refit GSE2 1510*b* and to autonomously alter motion of refit GSE2 1510*b*.

In exemplary embodiment, the system's refit control system on refit GSE2 1510*b* is programmatically configured to be operative to receive contextual environment data from the external management transceiver, where the contextual environment data is related to an operating environment for the second logistics ground support equipment (e.g., refit GSE3 1510*c*) and store the received contextual environment data in the database 310*b* on refit GSE2 1510*b* using the vehicle dynamics control processor 310 on refit GSE2 1510*b*. The system's refit control system on refit GSE2 1510*b* is further programmatically configured to be operative to receive first sensor data generated by the first group of proprioceptive sensors using the vehicle dynamics control processor 305 of the refit control system on refit GSE2 1510*b*, receive second sensor data generated by the second group of exteroceptive sensors using the data preprocessing control processor 305 on refit GSE2 1510*b*, and generate depth and spatial awareness information relative to the current state of refit GSE2 1510*b* based upon the second sensor data using the data preprocessing control processor 305 on refit GSE2 1510*b*. The system's refit control system on refit GSE2 1510*b* is further programmatically configured to be operative to determine a heading and speed for refit GSE2 1510*b* (as the first logistics ground support equipment) by the vehicle dynamics control processor 310 on refit GSE2 1510*b* based upon the depth and spatial awareness information as provided by the data preprocessing control processor 305 to the vehicle dynamics control processor 310, the received contextual environmental data related to the operating environment for the second logistics ground support equipment, and the first sensor data received by the vehicle dynamics control processor 310. The system's refit control system on refit GSE2 1510*b* is then further programmatically configured to be operative to activate (using the vehicle dynamics control processor 310 on refit GSE2 15010*b*) at least one of the actuators according to the determined heading and speed for refit GSE2 15010*b* as the first logistics ground support equipment.

In a further embodiment, the system may use locally maintained contextual environment data as well as contextual environment data received from the external management transceiver. For example, the system's refit control system may be programmatically configured in this further embodiment to be operative to access local contextual environment data from the database 310*b* using the vehicle dynamics control processor 310 on refit GSE2 1510*b* based upon the depth and spatial awareness information provided by the data preprocessing control processor 305 to the vehicle dynamics control processor 310; and determine the heading and speed for refit GSE2 1510b (as the first logistics ground support equipment) by the vehicle dynamics control processor 310 on refit GSE2 1510b based upon the depth and spatial awareness information as provided by the data preprocessing control processor 305 to the vehicle dynamics control processor 310 on refit GSE2 1510b, the received contextual environmental data related to the operating environment for the second logistics ground support equipment, the local contextual environmental data accessed by the vehicle dynamics control processor 310 on refit GSE2 1510b, and the first sensor data received by the vehicle dynamics control processor 310 on refit GSE2 1510b.

In a more detailed embodiment, the received contextual environment data may be information related to at least one known environment object existing in a current proximate operating environment of the second logistics ground support equipment and in a current proximate operating environment of refit GSE2 1510b (e.g., exemplary aircraft 1515 shown in FIG. 15). Further examples of such received contextual environment data may include, for example, information related to a building located within in a current proximate operating environment of the second logistics ground support equipment and in a current proximate operating environment of refit GSE2 1510b; a layout status of an aircraft serviced by the first logistics ground support equipment and the second logistics ground support equipment; a physical footprint of an aircraft serviced by the first logistics ground support equipment and the second logistics ground support equipment; a loading status of an aircraft serviced by the first logistics ground support equipment and the second logistics ground support equipment; a desired load for an aircraft serviced by the first logistics ground support equipment and the second logistics ground support equipment; a type of an aircraft serviced by the first logistics ground support equipment and the second logistics ground support equipment; and a geofenced boundary restriction for the first logistics ground support equipment and the second logistics ground support equipment.

In another example, the received contextual environment data may be information related to at least one environment object temporarily existing in a current proximate operating environment of the second logistics ground support equipment (e.g., refit GSE3 1510c) and in a current proximate operating environment of the first logistics ground support equipment (e.g., refit GSE2 1510b). In more detail, such received contextual environment data on the temporary environment object may be related to the depth and spatial awareness information for the temporary environment object. An example of such a temporary environment object may be a temporary barrier (e.g., a traffic cone, traffic barrier, temporary fence, and the like) existing in the current proximate operating environment of the first logistics ground support equipment and in the current proximate operating environment of the second logistics ground support equipment.

In still another exemplary embodiment, the received contextual environment data may be information related to at least one known environment object disposed in a current proximate operating environment of the second logistics ground support equipment and in a current proximate operating environment of the first logistics ground support equipment according to a known temporal use. For example, such a known temporal use may include a use specified during a predetermined time-based schedule, a predetermined time of day, one or more predetermined days of a week, and/or a use specified during a predetermined seasonal time period.

A further example may have the received contextual environment data being implemented with historical information on a current proximate operating environment of the second logistics ground support equipment common with a current proximate operating environment of the first logistics ground support equipment. For example, such historical information may be historic usage information about the current proximate operating environment of the second logistics ground support equipment common with the current proximate operating environment of the first logistics ground support equipment, such as historic usage information on loading or unloading cargo in the current proximate operating environment of the second logistics ground support equipment common with the current proximate operating environment of the first logistics ground support equipment.

The system embodiments described above involving received contextual environment data may, for example, implement the external management transceiver as a sensor-based transceiver (such as a sensor-based transceiver disposed on refit GSE1 1510a). Other embodiments may implement the external management transceiver as a central server, such as GSE fleet central server 1505 in communication with a fleet of ground support equipment 1510a-1510c in the operative environment for the logistics ground support equipment. The contextual environment data provided by such a central server may be temporal spatial awareness information managed by the central server and collected by the central server from each of the logistics ground support equipment 1510a-1510c in the fleet of ground support equipment.

What follows is a further collective description of different embodiments consistent with and exemplified by the above description.

Further Embodiments (Set B)—Feedback Loop Monitoring

1. An adaptive control system for improved engine performance on a logistics ground support equipment having at least an engine and a throttle control for the engine, the assembly comprising:

a control system attached to the logistics ground support equipment, the control system comprising a vehicle dynamics control processor and a data preprocessing control processor;

a plurality of sensors coupled to the control system and disposed on the logistics ground support equipment, the retrofitted sensors comprising a first proprioceptive sensor coupled to the vehicle dynamics control processor that monitors an engine operating parameter of the engine of the logistics ground support equipment, and a second group of exteroceptive sensors coupled to the data preprocessing control processor that monitor an exterior environment of the logistics ground support equipment;

a throttle actuator coupled to the vehicle dynamics control processor of the control system and disposed on the logistics ground support equipment to be in responsive communication with the throttle control for the engine;

wherein the control system is programmatically configured to be operative to (a) receive first sensor data generated by the first proprioceptive sensor using the vehicle dynamics control processor, the first sensor data indicating a current state of the engine operating parameter, (b) receive second sensor data generated by the second group of exteroceptive sensors using the data preprocessing control processor, the second sensor data indicating a current state of the exterior environment of the logistics ground support equipment, (c) determine, by the vehicle dynamics control processor, a predicted state of the exterior environment based upon the second sensor data, (d) proactively adjust the throttle control for the engine with an adjustment signal supplied by the vehicle dynamics control processor to the throttle actuator, wherein the level of the adjustment signal is based upon the first sensor data and the second sensor data, and (e) repeat functions (a)-(d) in an adaptive feedback loop to address latency in performance of the engine of the logistics ground support equipment.

2. The system of embodiment 1, wherein the engine operating parameter of the engine comprises a power generated by the engine as monitored by an air flow sensor as the first proprioceptive sensor.

3. The system of embodiment 1, wherein the engine operating parameter of the engine comprises a power generated by the engine as monitored by an engine RPM sensor as the first proprioceptive sensor.

4. The system of embodiment 1, wherein the engine operating parameter of the engine comprises a power generated by the engine as monitored by a transmission status sensor as the first proprioceptive sensor.

5. The system of embodiment 1, wherein the predicted state of the exterior environment is determined by the vehicle dynamics control processor based upon spatial awareness information provided to the vehicle dynamics control processor by the data preprocessing control processor, the spatial awareness information being generated by the data processing control processor using the second sensor data received by the data preprocessing control processor.

6. The system of embodiment 5, wherein the spatial awareness information provided to the vehicle dynamics control processor by the data preprocessing control processor is based upon location data representing a current position of the logistics ground support equipment as at least part of the second sensor data received by the data preprocessing control processor.

7. The system of embodiment 6, wherein the location data being generated by a GPS sensor disposed on the logistics ground support equipment as at least part of the second group of exteroceptive sensors.

8. The system of embodiment 6, wherein the location data being generated by an inertial measurement unit (IMU) sensor disposed on the logistics ground support equipment as at least part of the second group of exteroceptive sensors.

9. The system of embodiment 6, wherein the predicted state of the exterior environment is determined by the vehicle dynamics control processor based upon
(i) spatial awareness information provided to the vehicle dynamics control processor by the data preprocessing control processor, the spatial information being generated by the data processing control processor using the second sensor data received by the data preprocessing control processor; and
(ii) contextual environmental data accessed by the vehicle dynamics control processor, wherein the contextual environmental data identifies a known location of an environmental object.

10. The system of embodiment 1, wherein the predicted state of the exterior environment is determined by the vehicle dynamics control processor based upon depth information provided to the vehicle dynamics control processor by the data preprocessing control processor, the depth information being generated by the data processing control processor using the second sensor data received by the data preprocessing control processor.

11. The system of embodiment 10, wherein the depth information provided to the vehicle dynamics control processor by the data preprocessing control processor comprises object detection and distance estimation information representing one or more detected environmental objects in the exterior environment of the logistics ground support equipment, the object detection and distance estimation information being generated by the data processing control processor based upon at least part of the second sensor data received by the data preprocessing control processor.

12. The system of embodiment 11, wherein the object detection and distance estimation information being generated by the data preprocessing control processor based upon image data from a camera sensor disposed on the logistics ground support equipment as at least part of the second group of exteroceptive sensors.

13. The system of embodiment 11, wherein the object detection and distance estimation information being generated by the data preprocessing control processor based upon radar data from a radar sensor disposed on the logistics ground support equipment as at least part of the second group of exteroceptive sensors.

14. The system of embodiment 11, wherein the object detection and distance estimation information being generated by the data preprocessing control processor based upon multi-dimensional map data from a LiDAR sensor disposed on the logistics ground support equipment as at least part of the second group of exteroceptive sensors.

15. The system of embodiment 11, wherein the object detection and distance estimation information being generated by the data preprocessing control processor based upon proximity data from an ultrasonic sensor disposed on the logistics ground support equipment as at least part of the second group of exteroceptive sensors.

16. The system of embodiment 1, wherein the predicted state of the exterior environment is determined by the vehicle dynamics control processor based upon depth and spatial awareness information provided to the vehicle dynamics control processor by the data preprocessing control processor, the depth and spatial awareness information being generated by the data processing control processor using the second sensor data received by the data preprocessing control processor, the depth and spatial information being related to an environmental object in the exterior environment of the logistics ground support equipment.

17. The system of embodiment 16, wherein the environmental object comprises an aircraft.

18. The system of embodiment 16, wherein the environmental object comprises a restricted ramp area for aircraft operations.

19. The system of embodiment 16, wherein the environmental object comprises a change in roadway grade.

21. The system of embodiment 16, wherein the environmental object comprises a building.

22. The system of embodiment 16, wherein the environmental object comprises a transition between a first building and a second building.

23. The system of embodiment 1, wherein the predicted state of the exterior environment is determined by the vehicle dynamics control processor based upon orientation information provided to the vehicle dynamics control processor by the data preprocessing control processor, the orientation information being generated by the data processing control processor using the second sensor data received by the data preprocessing control processor, the orientation information being relative to an environmental object detected in the exterior environment of the logistics ground support equipment.

24. The system of embodiment 1 further comprising a second proprioceptive sensor coupled to the vehicle dynamics control processor that monitors a weight of cargo transported by the logistics ground support equipment;

wherein the control system is further programmatically configured to be operative to (f) receive third sensor data generated by the second proprioceptive sensor using the vehicle dynamics control processor, the third sensor data indicating the weight of the cargo transported by the logistics ground support equipment;

wherein the control system is programmatically configured to be operative to perform (d) by being further operative to proactively adjust the throttle control for the engine with the adjustment signal supplied by the vehicle dynamics control processor to the throttle actuator, wherein the level of the adjustment signal being based upon the first sensor data and the second sensor data and the third sensor data; and wherein the control system is programmatically configured to be operative to perform (e) by being further operative to repeat functions (a)-(d) and (f) in the adaptive feedback loop to address latency in performance of the engine of the logistics ground support equipment.

25. The system of embodiment 1 further comprising a second proprioceptive sensor coupled to the vehicle dynamics control processor that monitors a temperature related to the logistics ground support equipment;

wherein the control system is further programmatically configured to be operative to (f) receive third sensor data generated by the second proprioceptive sensor using the vehicle dynamics control processor, the third sensor data indicating the temperature related to the logistics ground support equipment;

wherein the control system is programmatically configured to be operative to perform (d) by being further operative to proactively adjust the throttle control for the engine with the adjustment signal supplied by the vehicle dynamics control processor to the throttle actuator, wherein the level of the adjustment signal being based upon the first sensor data and the second sensor data and the third sensor data; and wherein the control system is programmatically configured to be operative to perform (e) by being further operative to repeat functions (a)-(d) and (f) in the adaptive feedback loop to address latency in performance of the engine of the logistics ground support equipment.

26. The system of embodiment 1, wherein the control system is further programmatically configured to be operative to perform (e) by being operative to repeat functions (a)-(d) in the adaptive feedback loop within a predetermined time period to address latency in performance of the engine of the logistics ground support equipment.

27. A method for improved engine performance using an adaptive control system on a logistics ground support equipment having at least an engine and a throttle control for the engine, the method comprising the steps of:

(a) receiving, by a vehicle dynamics control processor, first sensor data generated by a first proprioceptive sensor that monitors an engine operating parameter of the engine, the first sensor data indicating a current state of the engine operating parameter;

(b) receiving, by a data preprocessing control processor, second sensor data generated by a second group of exteroceptive sensors that monitor an exterior environment of the logistics ground support equipment, the second sensor data indicating a current state of the exterior environment of the logistics ground support equipment;

(c) determining, by the vehicle dynamics control processor, a predicted state of the exterior environment based upon the second sensor data;

(d) proactively adjusting, by the vehicle dynamics control processor, a throttle control for the engine with an adjustment signal supplied by the vehicle dynamics control processor to a throttle actuator, wherein the level of the adjustment signal is based upon the first sensor data and the second sensor data; and (e) repeating steps (a)-(d) in an adaptive feedback loop to address latency in performance of the engine of the logistics ground support equipment.

28. The method of embodiment 27, wherein the engine operating parameter of the engine comprises a power generated by the engine as monitored by an air flow sensor as the first proprioceptive sensor.

29. The method of embodiment 27, wherein the engine operating parameter of the engine comprises a power generated by the engine as monitored by an engine RPM sensor as the first proprioceptive sensor.

30. The method of embodiment 27, wherein the engine operating parameter of the engine comprises a power generated by the engine as monitored by a transmission status sensor as the first proprioceptive sensor.

31. The method of embodiment 27, wherein step (c) comprises determining the predicted state of the exterior environment by the vehicle dynamics control processor based upon spatial awareness information provided to the vehicle dynamics control processor by the data preprocessing control processor, the spatial awareness information being generated by the data processing control processor using the second sensor data received by the data preprocessing control processor.

32. The method of embodiment 31, wherein the spatial awareness information provided to the vehicle dynamics control processor by the data preprocessing control processor is based upon location data representing a current position of the logistics ground support equipment as at least part of the second sensor data received by the data preprocessing control processor.

33. The method of embodiment 32, wherein the location data being generated by a GPS sensor disposed on the logistics ground support equipment as at least part of the second group of exteroceptive sensors.

34. The method of embodiment 32, wherein the location data being generated by an inertial measurement unit (IMU) sensor disposed on the logistics ground support equipment as at least part of the second group of exteroceptive sensors.

35. The method of embodiment 32, wherein step (c) comprises determining the predicted state of the exterior environment by the vehicle dynamics control processor based upon (i) spatial awareness information provided to the vehicle dynamics control processor by the data preprocessing control processor, the spatial information being generated by the data processing control processor using the second sensor data received by the data preprocessing control processor; and (ii) contextual environmental data accessed by the vehicle dynamics control processor, wherein the contextual environmental data identifies a known location of an environmental object.

36. The method of embodiment 27, wherein step (c) comprises determining the predicted state of the exterior environment by the vehicle dynamics control processor based upon depth information provided to the vehicle dynamics control processor by the data preprocessing control processor, the depth information being generated by the data processing control processor using the second sensor data received by the data preprocessing control processor.

37. The method of embodiment 36, wherein the depth information provided to the vehicle dynamics control processor by the data preprocessing control processor comprises object detection and distance estimation information representing one or more detected environmental objects in the exterior environment of the logistics ground support equipment, the object detection and distance estimation information being generated by the data processing control processor based upon at least part of the second sensor data received by the data preprocessing control processor.

38. The method of embodiment 37, wherein the object detection and distance estimation information being generated by the data preprocessing control processor based upon image data from a camera sensor disposed on the logistics ground support equipment as at least part of the second group of exteroceptive sensors.

39. The method of embodiment 37, wherein the object detection and distance estimation information being generated by the data preprocessing control processor based upon radar data from a radar sensor disposed on the logistics ground support equipment as at least part of the second group of exteroceptive sensors.

40. The method of embodiment 37, wherein the object detection and distance estimation information being generated by the data preprocessing control processor based upon multi-dimensional map data from a LiDAR sensor disposed on the logistics ground support equipment as at least part of the second group of exteroceptive sensors.

41. The method of embodiment 37, wherein the object detection and distance estimation information being generated by the data preprocessing control processor based upon proximity data from an ultrasonic sensor disposed on the logistics ground support equipment as at least part of the second group of exteroceptive sensors.

42. The method of embodiment 27, wherein step (c) comprises determining the predicted state of the exterior environment by the vehicle dynamics control processor based upon depth and spatial awareness information provided to the vehicle dynamics control processor by the data preprocessing control processor, the depth and spatial awareness information being generated by the data processing control processor using the second sensor data received by the data preprocessing control processor, the depth and spatial information being related to an environmental object in the exterior environment of the logistics ground support equipment.

43. The method of embodiment 42, wherein the environmental object comprises an aircraft.

44. The method of embodiment 42, wherein the environmental object comprises a restricted ramp area for aircraft operations.

45. The method of embodiment 42, wherein the environmental object comprises a change in roadway grade.

46. The method of embodiment 42, wherein the environmental object comprises a building.

47. The method of embodiment 42, wherein the environmental object comprises a transition between a first building and a second building.

48. The method of embodiment 27, wherein step (c) comprises determining the predicted state of the exterior environment by the vehicle dynamics control processor based upon orientation information provided to the vehicle dynamics control processor by the data preprocessing control processor, the orientation information being generated by the data processing control processor using the second sensor data received by the data preprocessing control processor, the orientation information being relative to an environmental object detected in the exterior environment of the logistics ground support equipment.

49. The method of embodiment 27 further comprising the step of (f) receiving, by the vehicle dynamics control processor, third sensor data generated by a second proprioceptive sensor coupled to the vehicle dynamics control processor that monitors a weight of cargo transported by the logistics ground support equipment, the third sensor data indicating the weight of the cargo transported by the logistics ground support equipment;

wherein step (d) comprises proactively adjusting, by the vehicle dynamics control processor, the throttle control for the engine with the adjustment signal supplied by the vehicle dynamics control processor to the throttle actuator, wherein the level of the adjustment signal being based upon the first sensor data and the second sensor data and the third sensor data; and wherein step (e) comprises repeating steps (a)-(d) and (f) in the adaptive feedback loop to address latency in performance of the engine of the logistics ground support equipment.

50. The method of embodiment 27 further comprising the step (f) receiving, by the vehicle dynamics control processor, third sensor data generated by a second proprioceptive sensor coupled to the vehicle dynamics control processor that monitors a temperature related to the logistics ground support equipment, the third sensor data indicating the temperature related to the logistics ground support equipment;

wherein step (d) comprises proactively adjusting, by the vehicle dynamics control processor, the throttle control for the engine with the adjustment signal supplied by the vehicle dynamics control processor to the throttle actuator, wherein the level of the adjustment signal being based upon the first sensor data and the second sensor data and the third sensor data; and wherein step (e) comprises repeating steps (a)-(d) and (f) in the adaptive feedback loop to address latency in performance of the engine of the logistics ground support equipment.

51. The method of embodiment 27, wherein step (e) comprises repeating functions (a)-(d) in the adaptive feedback loop within a predetermined time period to address latency in performance of the engine of the logistics ground support equipment.

Further Embodiments (Set C)—Data Preprocessing and Spatial Awareness

1. A retrofit assembly apparatus for use on a logistics ground support equipment to enhance a level of autonomous operation of the logistics ground support equipment, the assembly comprising:

a refit control system attached to the logistics ground support equipment, the refit control system comprising a vehicle dynamics control processor,
a data preprocessing control processor in communication with the vehicle dynamics control processor, and
a database operatively coupled to the vehicle dynamics control processor, the database maintaining contextual environment data related to an operating environment for the logistics ground support equipment;
a plurality of retrofitted sensors coupled to the refit control system and disposed on the logistics ground support equipment as retrofitted equipment to the logistics ground support equipment, the retrofitted sensors comprising
    a first group of proprioceptive sensors coupled to the vehicle dynamics control processor that monitor operating parameters and characteristics of the logistics ground support equipment, and
    a second group of exteroceptive sensors coupled to the data preprocessing control processor that monitor an exterior environment of the logistics ground support equipment;
a plurality of actuators coupled to the refit control system, wherein each of the actuators being disposed on the logistics ground support equipment as a retrofit actuator to add control of different ones of a plurality of control elements on the logistics ground support equipment and to autonomously alter motion of the logistics ground support equipment; and
wherein the refit control system is programmatically configured to be operative to
    receive first sensor data generated by the first group of proprioceptive sensors using the vehicle dynamics control processor of the refit control system,
    receive second sensor data generated by the second group of exteroceptive sensors using the data preprocessing control processor,
    generate depth and spatial awareness information relative to the current state of the logistics ground support equipment based upon the second sensor data using the data preprocessing control processor,
    access the contextual environment data from the database using the vehicle dynamics control processor based upon the depth and spatial awareness information provided by the data preprocessing control processor to the vehicle dynamics control processor,
    determine a heading and speed for the logistics ground support equipment by the vehicle dynamics control processor based upon the depth and spatial awareness information as provided by the data preprocessing control processor to the vehicle dynamics control processor, the contextual environmental data accessed by the vehicle dynamics control processor, and the first sensor data received by the vehicle dynamics control processor, and
    activate, by the vehicle dynamics control processor, at least one of the actuators according to the determined heading and speed for the logistics ground support equipment.

2. The apparatus of embodiment 1, wherein the contextual environment data comprises information related to at least one known environment object existing in a current proximate operating environment of the logistics ground support equipment.

3. The apparatus of embodiment 1, wherein the contextual environment data comprises information related to a building located within a current proximate operating environment of the logistics ground support equipment.

4. The apparatus of embodiment 1, wherein the contextual environment data comprises information related to a layout status of an aircraft serviced by the logistics ground support equipment.

5. The apparatus of embodiment 1, wherein the contextual environment data comprises information related to a physical footprint of an aircraft serviced by the logistics ground support equipment.

6. The apparatus of embodiment 1, wherein the contextual environment data comprises information related to a loading status of an aircraft serviced by the logistics ground support equipment.

7. The apparatus of embodiment 1, wherein the contextual environment data comprises information related to a desired load for an aircraft serviced by the logistics ground support equipment.

8. The apparatus of embodiment 1, wherein the contextual environment data comprises information related to a type of an aircraft serviced by the logistics ground support equipment.

9. The apparatus of embodiment 1, wherein the contextual environment data comprises information related to a geofenced boundary restriction for the logistics ground support equipment.

10. The apparatus of embodiment 1, wherein the contextual environment data comprises information related to at least one environment object temporarily existing in a current proximate operating environment of the logistics ground support equipment.

11. The apparatus of embodiment 10, wherein the at least one environment object is related to the depth and spatial awareness information.

12. The apparatus of embodiment 10, wherein the at least one environment object comprises a temporary barrier existing in the current proximate operating environment of the logistics ground support equipment.

13. The apparatus of embodiment 1, wherein the contextual environment data comprises information related to at least one known environment object disposed in a current proximate operating environment of the logistics ground support equipment according to a known temporal use.

14. The apparatus of embodiment 13, wherein the known temporal use comprises a use specified during a predetermined time-based schedule.

15. The apparatus of embodiment 14, wherein the predetermined time-based schedule comprises a use specified during a predetermined time of day.

16. The apparatus of embodiment 14, wherein the predetermined time-based schedule comprises a use specified during one or more predetermined days of a week.

17. The apparatus of embodiment 14, wherein the predetermined time-based schedule comprises a use specified during a predetermined seasonal time period.

18. The apparatus of embodiment 1, wherein the contextual environment data comprises historical information on a current proximate operating environment of the logistics ground support equipment.

19. The apparatus of embodiment 18, wherein the historical information comprises historic usage information about the current proximate operating environment of the logistics ground support equipment.

20. The apparatus of embodiment 18, wherein the historical information comprises historic usage information on loading cargo in the current proximate operating environment of the logistics ground support equipment.

21. The apparatus of embodiment 18, wherein the historical information comprises historic usage information on unloading cargo in the current proximate operating environment of the logistics ground support equipment.

22. The apparatus of embodiment 1, wherein the refit control system is programmatically configured to be further operative to receive the contextual environment data related to the operating environment for the logistics ground support equipment from an external transceiver.

23. The apparatus of embodiment 22, wherein the external transceiver comprises a sensor-based transceiver.

24. The apparatus of embodiment 23, wherein the sensor-based transceiver is disposed on another logistics ground support equipment.

25. The apparatus of embodiment 24, wherein the contextual environment data received from the sensor-based transceiver on the another logistics ground support equipment comprises information detected about an environment object existing in a local proximate operating environment of the another logistics ground support equipment.

26. The apparatus of embodiment 22, wherein the external transceiver comprises a central server in communication with a fleet of ground support equipment in the operative environment for the logistics ground support equipment.

27. The apparatus of embodiment 26, wherein the contextual environment data received from the central server comprises information detected about an environment object existing in a local proximate operating environment of another logistics ground support equipment from the fleet of ground support equipment.

28. The apparatus of embodiment 27, wherein the contextual environment data received from the central server comprises temporal spatial awareness information managed by the central server and collected by the central server from at least the another logistics ground support equipment in the fleet of ground support equipment.

Further Embodiments (Set D)—Systems Using Contextual Environment Data Received From an External Transceiver 1. A system to enhance a level of autonomous operation of a plurality of logistics ground support equipment operating as a fleet of ground support equipment, the system comprising:
an external management transceiver in communication with a first of the logistics ground support equipment and a second of the logistics ground support equipment;
a refit control system attached to the first logistics ground support equipment, the refit control system comprising
a vehicle dynamics control processor,
a data preprocessing control processor in communication with the vehicle dynamics control processor, and
a database operatively coupled to the vehicle dynamics control processor;
a plurality of retrofitted sensors coupled to the refit control system and disposed on the first logistics ground support equipment as retrofitted equipment to the first logistics ground support equipment, the retrofitted sensors comprising
a first group of proprioceptive sensors coupled to the vehicle dynamics control processor that monitor operating parameters and characteristics of the first logistics ground support equipment, and
a second group of exteroceptive sensors coupled to the data preprocessing control processor that monitor an exterior environment of the first logistics ground support equipment;
a plurality of actuators coupled to the refit control system, wherein each of the actuators being disposed on the first of the logistics ground support equipment as a retrofit actuator to add control of different ones of a plurality of control elements on the first logistics ground support equipment and to autonomously alter motion of the first of the logistics ground support equipment; and
wherein the refit control system is programmatically configured to be operative to
receive contextual environment data from the external management transceiver, the contextual environment data being related to an operating environment for the second logistics ground support equipment,
store the received contextual environment data in the database using the vehicle dynamics control processor,
receive first sensor data generated by the first group of proprioceptive sensors using the vehicle dynamics control processor of the refit control system,
receive second sensor data generated by the second group of exteroceptive sensors using the data preprocessing control processor,
generate depth and spatial awareness information relative to the current state of the first logistics ground support equipment based upon the second sensor data using the data preprocessing control processor,
determine a heading and speed for the first logistics ground support equipment by the vehicle dynamics control processor based upon the depth and spatial awareness information as provided by the data preprocessing control processor to the vehicle dynamics control processor, the received contextual environmental data related to the operating environment for the second logistics ground support equipment, and the first sensor data received by the vehicle dynamics control processor, and
activate, by the vehicle dynamics control processor, at least one of the actuators according to the determined heading and speed for the first logistics ground support equipment.

2. The system of embodiment 1, wherein the refit control system is programmatically configured to be further operative to
access local contextual environment data from the database using the vehicle dynamics control processor based upon the depth and spatial awareness information provided by the data preprocessing control processor to the vehicle dynamics control processor; and
determine the heading and speed for the first logistics ground support equipment by the vehicle dynamics control processor based upon the depth and spatial awareness information as provided by the data preprocessing control processor to the vehicle dynamics control processor, the received contextual environmental data related to the operating environment for the second logistics ground support equipment, the local contextual environmental data accessed by the vehicle dynamics control processor, and the first sensor data received by the vehicle dynamics control processor.

3. The system of embodiment 1, wherein the received contextual environment data comprises information related to at least one known environment object existing in a current proximate operating environment of the second logistics ground support equipment and in a current proximate operating environment of the first logistics ground support equipment.

4. The system of embodiment 1, wherein the received contextual environment data comprises information related to a building located within in a current proximate operating environment of the second logistics ground support equipment and in a current proximate operating environment of the first logistics ground support equipment.

5. The system of embodiment 1, wherein the received contextual environment data comprises information related to a layout status of an aircraft serviced by the first logistics ground support equipment and the second logistics ground support equipment.

6. The system of embodiment 1, wherein the received contextual environment data comprises information related to a physical footprint of an aircraft serviced by the first logistics ground support equipment and the second logistics ground support equipment.

7. The system of embodiment 1, wherein the received contextual environment data comprises information related to a loading status of an aircraft serviced by the first logistics ground support equipment and the second logistics ground support equipment.

8. The system of embodiment 1, wherein the received contextual environment data comprises information related to a desired load for an aircraft serviced by the first logistics ground support equipment and the second logistics ground support equipment.

9. The system of embodiment 1, wherein the received contextual environment data comprises information related to a type of an aircraft serviced by the first logistics ground support equipment and the second logistics ground support equipment.

10. The system of embodiment 1, wherein the received contextual environment data comprises information related to a geofenced boundary restriction for the first logistics ground support equipment and the second logistics ground support equipment.

11. The system of embodiment 1, wherein the received contextual environment data comprises information related to at least one environment object temporarily existing in a current proximate operating environment of the second logistics ground support equipment and in a current proximate operating environment of the first logistics ground support equipment.

12. The system of embodiment 11, wherein the at least one environment object is related to the depth and spatial awareness information.

13. The system of embodiment 11, wherein the at least one environment object comprises a temporary barrier existing in the current proximate operating environment of the first logistics ground support equipment and in the current proximate operating environment of the second logistics ground support equipment 14. The system of embodiment 1, wherein the received contextual environment data comprises information related to at least one known environment object disposed in a current proximate operating environment of the second logistics ground support equipment and in a current proximate operating environment of the first logistics ground support equipment according to a known temporal use.

15. The system of embodiment 14, wherein the known temporal use comprises a use specified during a predetermined time-based schedule.

16. The system of embodiment 15, wherein the predetermined time-based schedule comprises a use specified during a predetermined time of day.

17. The system of embodiment 15, wherein the predetermined time-based schedule comprises a use specified during one or more predetermined days of a week.

18. The system of embodiment 15, wherein the predetermined time-based schedule comprises a use specified during a predetermined seasonal time period.

19. The system of embodiment 1, wherein the received contextual environment data comprises historical information on a current proximate operating environment of the second logistics ground support equipment common with a current proximate operating environment of the first logistics ground support equipment.

20. The system of embodiment 19, wherein the historical information comprises historic usage information about the current proximate operating environment of the second logistics ground support equipment common with the current proximate operating environment of the first logistics ground support equipment.

21. The system of embodiment 19, wherein the historical information comprises historic usage information on loading cargo in the current proximate operating environment of the second logistics ground support equipment common with the current proximate operating environment of the first logistics ground support equipment.

22. The system of embodiment 19, wherein the historical information comprises historic usage information on unloading cargo in the current proximate operating environment of the second logistics ground support equipment common with the current proximate operating environment of the first logistics ground support equipment.

23. The system of embodiment 1, wherein the external management transceiver comprises a sensor-based transceiver.

24. The system of embodiment 23, wherein the sensor-based transceiver is disposed on a third of the logistics ground support equipment.

25. The system of embodiment 1, wherein the external management transceiver comprises a central server in communication with a fleet of ground support equipment in the operative environment for the first logistics ground support equipment.

26. The system of embodiment 25, the received contextual environment data received from the central server comprises temporal spatial awareness information managed by the central server and collected by the central server from each of the logistics ground support equipment in the fleet of ground support equipment.

Those skilled in the art will appreciate the method or process embodiments as disclosed and explained above may be implemented with an apparatus or system and implemented with the above-described vehicles, ground support equipment, suite of sensors, different processor modules/controller modules, and the different software modules running on the different processor/controller modules as described above. Such software modules may be stored on non-transitory computer-readable medium in each of the processor/controller modules. Thus, when executing such software modules, the collective processor/controller modules of the enhanced system for improved operations for logistics ground support equipment that may be operative to perform the operations of the exemplary apparatus and systems disclosed above or steps from the exemplary methods disclosed above, including variations of the different methods, apparatus, and systems.

In summary, it should be emphasized that the sequence of operations to perform any of the methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations (such as cargo and package loading, transport, and unloading) using an enhanced industrial vehicle as a type of logistics ground support equipment (such as a cargo tractor and associated dollies loaded with cargo/packages) that is improved to better improvement performance during logistics operations and, in some embodiments, enhanced to avoid collisions with refined automated and autonomous and/or semi-autonomous features.

As noted above, the exemplary embodiments disclosed herein may be used independently from one another and/or in combination with one another and may have applications to devices, apparatus, systems and methods not disclosed herein. Further, those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description and, instead, is intended to cover modifications and variations using one or more of the aspects disclosed herein.

What is claimed:

1. A retrofit assembly apparatus for use on a logistics ground support equipment to enhance a level of autonomous operation of the logistics ground support equipment, the assembly comprising:
    a refit control system attached to the logistics ground support equipment, the refit control system comprising
        a vehicle dynamics control processor,
        a data preprocessing control processor in communication with the vehicle dynamics control processor, and
        a database operatively coupled to the vehicle dynamics control processor, the database maintaining contextual environment data related to an operating environment for the logistics ground support equipment;
    a plurality of retrofitted sensors coupled to the refit control system and disposed on the logistics ground support equipment as retrofitted equipment to the logistics ground support equipment, the retrofitted sensors comprising
        a first group of proprioceptive sensors coupled to the vehicle dynamics control processor that monitor operating parameters and characteristics of the logistics ground support equipment, and
        a second group of exteroceptive sensors coupled to the data preprocessing control processor that monitor an exterior environment of the logistics ground support equipment;
    a plurality of actuators coupled to the refit control system, wherein each of the actuators being disposed on the logistics ground support equipment as a retrofit actuator to add control of different ones of a plurality of control elements on the logistics ground support equipment and to autonomously alter motion of the logistics ground support equipment; and
    wherein the refit control system is programmatically configured to be operative to
        receive first sensor data generated by the first group of proprioceptive sensors using the vehicle dynamics control processor of the refit control system,
        receive second sensor data generated by the second group of exteroceptive sensors using the data preprocessing control processor,
        generate depth and spatial awareness information relative to the current state of the logistics ground support equipment based upon the second sensor data using the data preprocessing control processor,
        access the contextual environment data from the database using the vehicle dynamics control processor based upon the depth and spatial awareness information provided by the data preprocessing control processor to the vehicle dynamics control processor,
        determine a heading and speed for the logistics ground support equipment by the vehicle dynamics control processor based upon the depth and spatial awareness information as provided by the data preprocessing control processor to the vehicle dynamics control processor, the contextual environmental data accessed by the vehicle dynamics control processor, and the first sensor data received by the vehicle dynamics control processor, and
        activate, by the vehicle dynamics control processor, at least one of the actuators according to the determined heading and speed for the logistics ground support equipment.

2. The apparatus of claim 1, wherein the contextual environment data comprises information related to at least one known environment object existing in a current proximate operating environment of the logistics ground support equipment.

3. The apparatus of claim 1, wherein the contextual environment data comprises information related to a building located within a current proximate operating environment of the logistics ground support equipment.

4. The apparatus of claim 1, wherein the contextual environment data comprises information related to a layout status of an aircraft serviced by the logistics ground support equipment.

5. The apparatus of claim 1, wherein the contextual environment data comprises information related to a physical footprint of an aircraft serviced by the logistics ground support equipment.

6. The apparatus of claim 1, wherein the contextual environment data comprises information related to a loading status of an aircraft serviced by the logistics ground support equipment.

7. The apparatus of claim 1, wherein the contextual environment data comprises information related to a desired load for an aircraft serviced by the logistics ground support equipment.

8. The apparatus of claim 1, wherein the contextual environment data comprises information related to a type of an aircraft serviced by the logistics ground support equipment.

9. The apparatus of claim 1, wherein the contextual environment data comprises information related to a geofenced boundary restriction for the logistics ground support equipment.

10. The apparatus of claim 1, wherein the contextual environment data comprises information related to at least one environment object temporarily existing in a current proximate operating environment of the logistics ground support equipment.

11. The apparatus of claim 10, wherein the at least one environment object is related to the depth and spatial awareness information.

12. The apparatus of claim 10, wherein the at least one environment object comprises a temporary barrier existing in the current proximate operating environment of the logistics ground support equipment.

13. The apparatus of claim 1, wherein the contextual environment data comprises information related to at least one known environment object disposed in a current proximate operating environment of the logistics ground support equipment according to a known temporal use.

14. The apparatus of claim 13, wherein the known temporal use comprises a use specified during a predetermined time-based schedule.

15. The apparatus of claim 14, wherein the predetermined time-based schedule comprises a use specified during a predetermined time of day.

16. The apparatus of claim 14, wherein the predetermined time-based schedule comprises a use specified during one or more predetermined days of a week.

17. The apparatus of claim 14, wherein the predetermined time-based schedule comprises a use specified during a predetermined seasonal time period.

18. The apparatus of claim 1, wherein the contextual environment data comprises historical information on a current proximate operating environment of the logistics ground support equipment.

19. The apparatus of claim 18, wherein the historical information comprises historic usage information about the current proximate operating environment of the logistics ground support equipment.

20. The apparatus of claim 18, wherein the historical information comprises historic usage information on loading cargo in the current proximate operating environment of the logistics ground support equipment.

21. The apparatus of claim 18, wherein the historical information comprises historic usage information on unloading cargo in the current proximate operating environment of the logistics ground support equipment.

22. The apparatus of claim 1, wherein the refit control system is programmatically configured to be further operative to receive the contextual environment data related to the operating environment for the logistics ground support equipment from an external transceiver.

23. The apparatus of claim 22, wherein the external transceiver comprises a sensor-based transceiver.

24. The apparatus of claim 23, wherein the sensor-based transceiver is disposed on another logistics ground support equipment.

25. The apparatus of claim 24, wherein the contextual environment data received from the sensor-based transceiver on the another logistics ground support equipment comprises information detected about an environment object existing in a local proximate operating environment of the another logistics ground support equipment.

26. The apparatus of claim 22, wherein the external transceiver comprises a central server in communication with a fleet of ground support equipment in the operative environment for the logistics ground support equipment.

27. The apparatus of claim 26, wherein the contextual environment data received from the central server comprises information detected about an environment object existing in a local proximate operating environment of another logistics ground support equipment from the fleet of ground support equipment.

28. The apparatus of claim 27, wherein the contextual environment data received from the central server comprises temporal spatial awareness information managed by the central server and collected by the central server from at least the another logistics ground support equipment in the fleet of ground support equipment.

* * * * *